US008103305B2

(12) United States Patent
Rooyen

(10) Patent No.: US 8,103,305 B2
(45) Date of Patent: Jan. 24, 2012

(54) METHOD AND SYSTEM FOR CELLULAR NETWORK AND INTEGRATED BROADCAST TELEVISION (TV) DOWNLINK WITH INTELLIGENT SERVICE CONTROL WITH FEEDBACK INFORMATION

(75) Inventor: Pieter Van Rooyen, San Diego, CA (US)

(73) Assignee: Broadcom Corporation, Irvine, CA (US)

( * ) Notice: Subject to any disclaimer, the term of this patent is extended or adjusted under 35 U.S.C. 154(b) by 400 days.

(21) Appl. No.: 11/010,855

(22) Filed: Dec. 13, 2004

(65) Prior Publication Data

US 2006/0128424 A1    Jun. 15, 2006

(51) Int. Cl.
*H04M 1/00* (2006.01)
(52) U.S. Cl. ............... 455/552.1; 455/550.1; 455/553.1; 455/556.1; 455/3.02; 455/3.05
(58) Field of Classification Search ............... 455/552.1, 455/553.1, 550.1, 556.1, 3.02, 426.1
See application file for complete search history.

(56) References Cited

U.S. PATENT DOCUMENTS

| | | | | | |
|---|---|---|---|---|---|
| 5,784,362 | A | * | 7/1998 | Turina | 370/321 |
| 5,818,906 | A | * | 10/1998 | Grau et al. | 379/32.04 |
| 6,055,419 | A | * | 4/2000 | Beard | 455/142 |
| 6,567,660 | B1 | * | 5/2003 | Wegener | 455/418 |
| 7,103,374 | B2 | | 9/2006 | Yla-Jaaski et al. | |
| 7,171,212 | B2 | * | 1/2007 | Kim et al. | 455/450 |
| 7,245,923 | B2 | * | 7/2007 | Frank et al. | 455/456.1 |
| 2002/0059614 | A1 | * | 5/2002 | Lipsanen et al. | 725/75 |
| 2002/0122498 | A1 | * | 9/2002 | Dogan | 375/259 |
| 2003/0039237 | A1 | * | 2/2003 | Forslow | 370/352 |
| 2005/0113099 | A1 | * | 5/2005 | Eriksson et al. | 455/450 |
| 2006/0079291 | A1 | * | 4/2006 | Granovetter et al. | 455/563 |
| 2006/0128304 | A1 | | 6/2006 | Ramaswamy | |
| 2006/0192632 | A1 | * | 8/2006 | Nakai et al. | 333/133 |
| 2006/0251115 | A1 | * | 11/2006 | Haque et al. | 370/466 |
| 2006/0265491 | A1 | * | 11/2006 | Litwin | 709/224 |

FOREIGN PATENT DOCUMENTS

CN    1260094    7/2000
(Continued)

OTHER PUBLICATIONS

Rathnam S et al, "A Single-Chip Dtv Media Processor", Jun. 2, 1998, pp. 142-143, XP010282975.

(Continued)

*Primary Examiner* — Dwayne Bost
*Assistant Examiner* — Inder P Mehra
(74) *Attorney, Agent, or Firm* — McAndrews, Held & Malloy, Ltd.

(57) ABSTRACT

Aspects of the present invention may be found in a method and system for cellular network services and an integrated broadcast television (TV) downlink having intelligent service control with feedback information. The system may comprise cellular processing circuitry in a mobile terminal that processes a plurality of cellular frequency band communications services which comprise at least one voice service and at least one data service, in a single cellular processor integrated circuit in a mobile terminal. In addition, the system may comprise broadcast processing circuitry in the mobile terminal that processes VHF/UHF band broadcast services in a single broadcast processor integrated circuit in the mobile terminal. The cellular processing circuitry may communicate with, and share at least a single memory with, the broadcast processing circuitry. The cellular processing circuitry may utilize at least the single memory to request at least a portion of information deliverable via the cellular frequency band communications services for delivery via VHF/UHF band broadcast services.

18 Claims, 15 Drawing Sheets

FOREIGN PATENT DOCUMENTS

| | | | |
|---|---|---|---|
| EP | 1233576 | * | 8/2002 |
| EP | 1233576 A | | 8/2002 |
| WO | WO 2004/080011 | | 9/2004 |

OTHER PUBLICATIONS

Senn P, "Telecommunications Applications: New Challenges for Microelectronics", Microelectronic Engineering, Dec. 2000, Elsevier Publishers BV, Amsterdam, NL, pp. 5-14, XP004360487, ISSN: 0167-9317.

Heuck C, "Analysis of the Performance of Hybrid (Broadcast/Mobile) Networks", Consumer Electronics, 204 IEEE International Symposium on Reading, UK Sep. 1-3, 2004, Piscataway, NJ, USA, IEEE, pp. 503-508, XP010755922, ISBN: 0-7803-8527-6.

* cited by examiner

METHOD AND SYSTEM FOR CELLULAR NETWORK AND INTEGRATED BROADCAST TELEVISION (TV) DOWNLINK WITH INTELLIGENT SERVICE CONTROL WITH FEEDBACK INFORMATION

CROSS-REFERENCE TO RELATED APPLICATIONS/INCORPORATION BY REFERENCE

This application makes reference to:
U.S. patent application Ser. No. 11/010,991, filed Dec. 13, 2004;
U.S. patent application Ser. No. 11/010,847, filed Dec. 13, 2004;
U.S. patent application Ser. No. 11/010,461, filed Dec. 13, 2004;
U.S. patent application Ser. No. 11/010,877, filed Dec. 13, 2004;
U.S. patent application Ser. No. 11/010,914, filed Dec. 13, 2004;
U.S. patent application Ser. No. 11/010,486, filed Dec. 13, 2004;
U.S. patent application Ser. No. 11/010,903, filed Dec. 13, 2004;
U.S. patent application Ser. No. 11/011,009, filed Dec. 13, 2004;
U.S. patent application Ser. No. 11/010,681, filed Dec. 13, 2004;
U.S. patent application Ser. No. 11/010,743, filed Dec. 13, 2004;
U.S. patent application Ser. No. 11/010,983, filed Dec. 13, 2004;
U.S. patent application Ser. No. 11/011,000, filed Dec. 13, 2004;
U.S. patent application Ser. No. 11/010,883, filed Dec. 13, 2004;
U.S. patent application Ser. No. 11/011,006, filed Dec. 13, 2004;
U.S. patent application Ser. No. 11/010,487, filed Dec. 13, 2004;
U.S. patent application Ser. No. 11/010,481, filed Dec. 13, 2004; and
U.S. patent application Ser. No. 11/010,524, filed Dec. 13, 2004.

FIELD OF THE INVENTION

Certain embodiments of the invention relate to communication of information via a plurality of different networks. More specifically, certain embodiments of the invention relate to a method and system for cellular network services and an integrated broadcast television (TV) downlink having intelligent service control with feedback information.

BACKGROUND OF THE INVENTION

Broadcasting and telecommunications have historically occupied separate fields. In the past, broadcasting was largely an "over-the-air" medium while wired media carried telecommunications. That distinction may no longer apply as both broadcasting and telecommunications may be delivered over either wired or wireless media. Present development may adapt broadcasting to mobility services. One limitation has been that broadcasting may often require high bit rate data transmission at rates higher than could be supported by existing mobile communications networks. However, with emerging developments in wireless communications technology, even this obstacle may be overcome.

Terrestrial television and radio broadcast networks have made use of high power transmitters covering broad service areas, which enable one-way distribution of content to user equipment such as televisions and radios. By contrast, wireless telecommunications networks have made use of low power transmitters, which have covered relatively small areas known as "cells". Unlike broadcast networks, wireless networks may be adapted to provide two-way interactive services between users of user equipment such as telephones and computer equipment.

The introduction of cellular communications systems in the late 1970's and early 1980's represented a significant advance in mobile communications. The networks of this period may be commonly known as first generation, or "1G" systems. These systems were based upon analog, circuit-switching technology, the most prominent of these systems may have been the advanced mobile phone system (AMPS). Second generation, or "2G" systems ushered improvements in performance over 1G systems and introduced digital technology to mobile communications. Exemplary 2G systems include the global system for mobile communications (GSM), digital AMPS (D-AMPS), and code division multiple access (CDMA). Many of these systems have been designed according to the paradigm of the traditional telephony architecture, often focused on circuit-switched services, voice traffic, and supported data transfer rates up to 14.4 kbits/s. Higher data rates were achieved through the deployment of "2.5G" networks, many of which were adapted to existing 2G network infrastructures. The 2.5G networks began the introduction of packet-switching technology in wireless networks. However, it is the evolution of third generation, or "3G" technology which may introduce fully packet-switched networks, which support high-speed data communications.

The general packet radio service (GPRS), which is an example of a 2.5G network service oriented for data communications, comprises enhancements to GSM which required additional hardware and software elements in existing GSM network infrastructures. Where GSM may allot a single time slot in a time division multiple access (TDMA) frame, GPRS may allot up to 8 such time slots providing a data transfer rate of up to 115.2 kbits/s. Another 2.5G network, enhanced data rates for GSM evolution (EDGE), also comprises enhancements to GSM, and like GPRS, EDGE may allocate up to 8 time slots in a TDMA frame for packet-switched, or packet mode, transfers. However, unlike GPRS, EDGE adapts 8 phase shift keying (8-PSK) modulation to achieve data transfer rates which may be as high as 384 kbits/s.

The universal mobile telecommunications system (UMTS) is an adaptation of a 3G system, which is designed to offer integrated voice, multimedia, and Internet access services to portable user equipment. The UMTS adapts wideband CDMA (W-CDMA) to support data transfer rates, which may be as high as 2 Mbits/s. One reason why W-CDMA may support higher data rates is that W-CDMA channels may have a bandwidth of 5 MHz versus the 200 kHz channel bandwidth in GSM. A related 3G technology, high speed downlink packet access (HSDPA), is an Internet protocol (IP) based service oriented for data communications, which adapts W-CDMA to support data transfer rates of the order of 10 Mbits/s. HSDPA achieves higher data rates through a plurality of methods. For example, many transmission decisions may be made at the base station level, which is much closer to the user equipment as opposed to being made at a mobile switching center or office. These may include decisions about the scheduling of data to be transmitted, when data are to be retransmitted, and assessments about the quality of the transmission channel. HSDPA may also utilize variable coding rates in transmitted data. HSDPA also supports 16-level quadrature amplitude modulation (16-QAM) over a high-speed downlink shared channel (HS-DSCH), which permits a plurality of users to share an air interface channel.

The multiple broadcast/multicast service (MBMS) is an IP datacast service, which may be deployed in EDGE and UMTS networks. The impact of MBMS is largely within the network in which a network element adapted to MBMS, the broadcast multicast service center (BM-SC), interacts with other network elements within a GSM or UMTS system to manage the distribution of content among cells within a network. User equipment may be required to support functions for the activation and deactivation of MBMS bearer service. MBMS may be adapted for delivery of video and audio information over wireless networks to user equipment. MBMS may be integrated with other services offered over the wireless network to realize multimedia services, such as multicasting, which may require two-way interaction with user equipment.

Standards for digital television terrestrial broadcasting (DTTB) have evolved around the world with different systems being adopted in different regions. The three leading DTTB systems are, the advanced standards technical committee (ATSC) system, the digital video broadcast terrestrial (DVB-T) system, and the integrated service digital broadcasting terrestrial (ISDB-T) system. The ATSC system has largely been adopted in North America, South America, Taiwan, and South Korea. This system adapts trellis coding and 8-level vestigial sideband (8-VSB) modulation. The DVB-T system has largely been adopted in Europe, the Middle East, Australia, as well as parts of Africa and parts of Asia. The DVB-T system adapts coded orthogonal frequency division multiplexing (COFDM). The ISDB-T system has been adopted in Japan and adapts bandwidth segmented transmission orthogonal frequency division multiplexing (BST-OFDM). The various DTTB systems may differ in important aspects, some systems employ a 6 MHz channel separation, while others may employ 7 MHz or 8 MHz channel separations. Planning for the allocation of frequency spectrum may also vary among countries with some countries integrating frequency allocation for DTTB services into the existing allocation plan for legacy analog broadcasting systems. In such instances, broadcast towers for DTTB may be co-located with broadcast towers for analog broadcasting services with both services being allocated similar geographic broadcast coverage areas. In other countries, frequency allocation planning may involve the deployment of single frequency networks (SFNs), in which a plurality of towers, possibly with overlapping geographic broadcast coverage areas (also known as "gap fillers"), may simultaneously broadcast identical digital signals. SFNs may provide very efficient use of broadcast spectrum as a single frequency may be used to broadcast over a large coverage area in contrast to some of the conventional systems, which may be used for analog broadcasting, in which gap fillers transmit at different frequencies to avoid interference.

Even among countries adopting a common DTTB system, variations may exist in parameters adapted in a specific national implementation. For example, DVB-T not only supports a plurality of modulation schemes, comprising quadrature phase shift keying (QPSK), 16-QAM, and 64 level QAM (64-QAM), but DVB-T offers a plurality of choices for the number of modulation carriers to be used in the COFDM scheme. The "2K" mode permits 1,705 carrier frequencies which may carry symbols, each with a useful duration of 224 µs for an 8 MHz channel. In the "8K" mode there are 6,817 carrier frequencies, each with a useful symbol duration of 896 µs for an 8 MHz channel. In SFN implementations, the 2K mode may provide comparatively higher data rates but smaller geographical coverage areas than may be the case with the 8K mode. Different countries adopting the same system may also employ different channel separation schemes.

While 3G systems are evolving to provide integrated voice, multimedia, and data services to mobile user equipment, there may be compelling reasons for adapting DTTB systems for this purpose. One of the more notable reasons may be the high data rates which may be supported in DTTB systems. For example, DVB-T may support data rates of 15 Mbits/s in an 8 MHz channel in a wide area SFN. There are also significant challenges in deploying broadcast services to mobile user equipment. Many handheld portable devices, for example, may require that services consume minimum power to extend battery life to a level, which may be acceptable to users. Another consideration is Doppler effect in moving user equipment, which may cause inter-symbol interference in received signals. Among the three major DTTB systems, ISDB-T was originally designed to support broadcast services to mobile user equipment. While DVB-T may not have been originally designed to support mobility broadcast services, a number of adaptations have been made to provide support for mobile broadcast capability. The adaptation of DVB-T to mobile broadcasting is commonly known as DVB handheld (DVB-H).

To meet requirements for mobile broadcasting the DVB-H specification may support time slicing to reduce power consumption at the user equipment, addition of a 4K mode to enable network operators to make tradeoffs between the advantages of the 2K mode and those of the 8K mode, and an additional level of forward error correction on multiprotocol encapsulated data—forward error correction (MPE-FEC) to make DVB-H transmissions more robust to the challenges presented by mobile reception of signals and to potential limitations in antenna designs for handheld user equipment. DVB-H may also use the DVB-T modulation schemes, like QPSK and 16-quadrature amplitude modulation (16-QAM), which may be most resilient to transmission errors. MPEG audio and video services may be more resilient to error than data, thus additional forward error correction may not be required to meet DTTB service objectives.

Time slicing may reduce power consumption in user equipment by increasing the burstiness of data transmission. Instead of transmitting data at the received rate, under time slicing techniques, the transmitter may delay the sending of data to user equipment and send data later but at a higher bit rate. This may reduce total data transmission time over the air, time, which may be used to temporarily power down the receiver at the user equipment. Time slicing may also facilitate service handovers as user equipment moves from one cell to another because the delay time imposed by time slicing may be used to monitor transmitters in neighboring cells. The MPE-FEC may comprise Reed-Solomon coding of IP data packets, or packets using other data protocols. The 4K mode in DVB-H may utilize 3,409 carriers, each with a useful duration of 448 µs for an 8 MHz channel. The 4K mode may enable network operators to realize greater flexibility in network design at minimum additional cost. Importantly, DVB-T and DVB-H may coexist in the same geographical area. Transmission parameter signaling (TPS) bits which are carried in the header of transmitted messages may indicate whether a given DVB transmission is DVB-T or DVB-H, in addition to indicating whether DVB-H specific features, such as time slicing, or MPE-FEC are to be performed at the receiver. As time slicing may be a mandatory feature of DVB-H, an indication of time slicing in the TPS may indicate that the received information is from a DVB-H service.

With the convergence of next generation networks which offer a plurality integrated services which may be offered in disparate conventional networks come requirements for new capabilities in mobile terminals. Some conventional mobile terminals may be adapted to communicating with cellular networks only, while some receiver devices may be adapted to the reception of television and radio services only. Thus, users who wish to receive both broadcast and telecommunications services while mobile may be required to carry at least two devices, a mobile telephone, and one or more devices for the reception of television and radio broadcast services.

Further limitations and disadvantages of conventional and traditional approaches will become apparent to one of skill in the art, through comparison of such systems with some aspects of the present invention as set forth in the remainder of the present application with reference to the drawings.

BRIEF SUMMARY OF THE INVENTION

Certain embodiments of the invention provide a method and system for mobile architecture supporting cellular or wireless networks and broadcast reception utilizing a single chip cellular and single chip broadcast silicon solution. Aspects of the system may comprise cellular processing circuitry in a mobile terminal that processes a plurality of cellular frequency band communications services which comprise at least one voice service and at least one data service, in a single cellular processor integrated circuit in a mobile terminal. In addition, the system may comprise broadcast processing circuitry in the mobile terminal that processes VHF/UHF band broadcast services in a single broadcast processor integrated circuit in the mobile terminal. The cellular processing circuitry may communicate with, and share at least a single memory with, the broadcast processing circuitry. The cellular processing circuitry in the mobile terminal may utilize at least the single memory to request at least a portion of information deliverable via the plurality of cellular frequency band communications services for delivery via VHF/UHF band broadcast services at the mobile terminal. The cellular processing circuitry may utilize at least the single memory to request at least a portion of information deliverable via the VHF/UHF band broadcast services for delivery via the plurality of cellular frequency band communications services at the mobile terminal.

In one aspect of the system the single cellular processor integrated circuit may utilize at least the single memory to process information received from the plurality of cellular frequency band communications services. The system may further comprise circuitry that couples the single memory, the single cellular processor integrated circuit, and the single broadcast processor integrated circuit via a common interface. The single cellular processor integrated circuit may utilize at least the single memory while processing information received from VHF/UHF band broadcast services. The single broadcast processor integrated circuit may utilize at least the single memory while processing information received from the plurality of cellular frequency band communications services. The single broadcast processor integrated circuit may utilize at least the single memory while processing information received from VHF/UHF band broadcast services. The single cellular processor integrated circuit may exchange messages with the single broadcast processor integrated circuit while processing information received from the plurality of cellular frequency band communications services. The single broadcast processor integrated circuit may exchange messages with the single cellular processor integrated circuit while processing information received from VHF/UHF band broadcast services.

In another aspect, a system for communicating with a plurality of communications networks may comprise a mobile terminal, which comprises a single cellular processor integrated circuit that processes at least one voice channel and at least one data channel, and a channel interface coupled to the single cellular processor integrated circuit. A single broadcast processor integrated circuit that processes a UHF/VHF channel may also be coupled to the channel interface. The system may further comprise a memory interface coupled to the single cellular processor integrated circuit, the single broadcast processor integrated circuit also coupled to the memory interface, and memory coupled to the memory interface. Power management circuitry may be coupled to a control bus. The channel interface may couple the system to a radio frequency front end (RFFE).

The system may comprise a serial interface coupled to the single cellular processor integrated circuit and to the single broadcast processor integrated circuit. The serial interface may couple the system to a plurality of user interfaces comprising at least one of a display, a keypad, a camera, a frequency modulation (FM) radio, a wireless local area network (WLAN), an assisted global positioning service (A-GPS), a universal subscriber identity module (USIM), and a Bluetooth interface.

Aspects of the method may comprise processing a plurality of cellular frequency band communications services, services which comprise at least one voice service and at least one data service, in a single cellular processor integrated circuit in a mobile terminal. In addition, the method may comprise processing VHF/UHF band broadcast services in a single broadcast processor integrated circuit in the mobile terminal. The cellular processing circuitry may communicate with, and share at least a single memory with, the broadcast processing circuitry. The method may comprise utilizing at least the single memory in the mobile terminal to request at least a portion of information deliverable via the plurality of cellular frequency band communications services for delivery via VHF/UHF band broadcast services at the mobile terminal. The method may also comprise utilizing at least the single memory in the mobile terminal to request at least a portion of the information deliverable via VHF/UHF band broadcast services for delivery via the plurality of cellular frequency band communications services at the mobile terminal.

In one aspect of the method the single cellular processor integrated circuit may utilize at least the single memory to process information received from the plurality of cellular frequency band communications services. The method may further comprise coupling the single memory, the single cellular processor integrated circuit, and the single broadcast processor integrated circuit via a common interface. The single cellular processor integrated circuit may utilize at least the single memory while processing information received from VHF/UHF band broadcast services. The single broadcast processor integrated circuit may utilize at least the single memory while processing information received from the plurality of cellular frequency band communications services. The single broadcast processor integrated circuit may utilize at least the single memory while processing information received from VHF/UHF band broadcast services. The single cellular processor integrated circuit may exchange messages with the single broadcast processor integrated circuit while processing information received from the plurality of cellular frequency band communications services. The single broadcast processor integrated circuit may exchange messages with the single cellular processor integrated circuit while processing information received from VHF/UHF band broadcast services.

These and other advantages, aspects and novel features of the present invention, as well as details of an illustrated embodiment thereof, will be more fully understood from the following description and drawings.

DETAILED DESCRIPTION OF THE INVENTION

Certain embodiments of the invention may be found in a method and system for cellular network services and an integrated broadcast television (TV) downlink having intelligent service control with feedback information. The feedback information may comprise quality of service (QoS) information, for example. In one aspect of the invention a mobile terminal is adapted to receiving a plurality of cellular frequency band communications services, in addition to receiving very high frequency (VHF) and ultra high frequency (UHF) band broadcast services. A single cellular processor integrated circuit (IC) may process a plurality of cellular frequency band communications services at the mobile terminal. The single cellular processor IC and the single broadcast processor IC may access a single memory which itself may comprise a plurality of IC devices. The ability to share a common memory may enable the coordination of a plurality of cellular frequency band communications services with VHF/UHF band broadcast services at the mobile terminal. Thus, the single cellular processor IC may process information received from VHF/UHF broadcast services. The single broadcast processor IC may process information received from the plurality of cellular communications services. The integration of cellular and broadcast services may occur at the mobile terminal without manual intervention from a user.

Figure 1A:
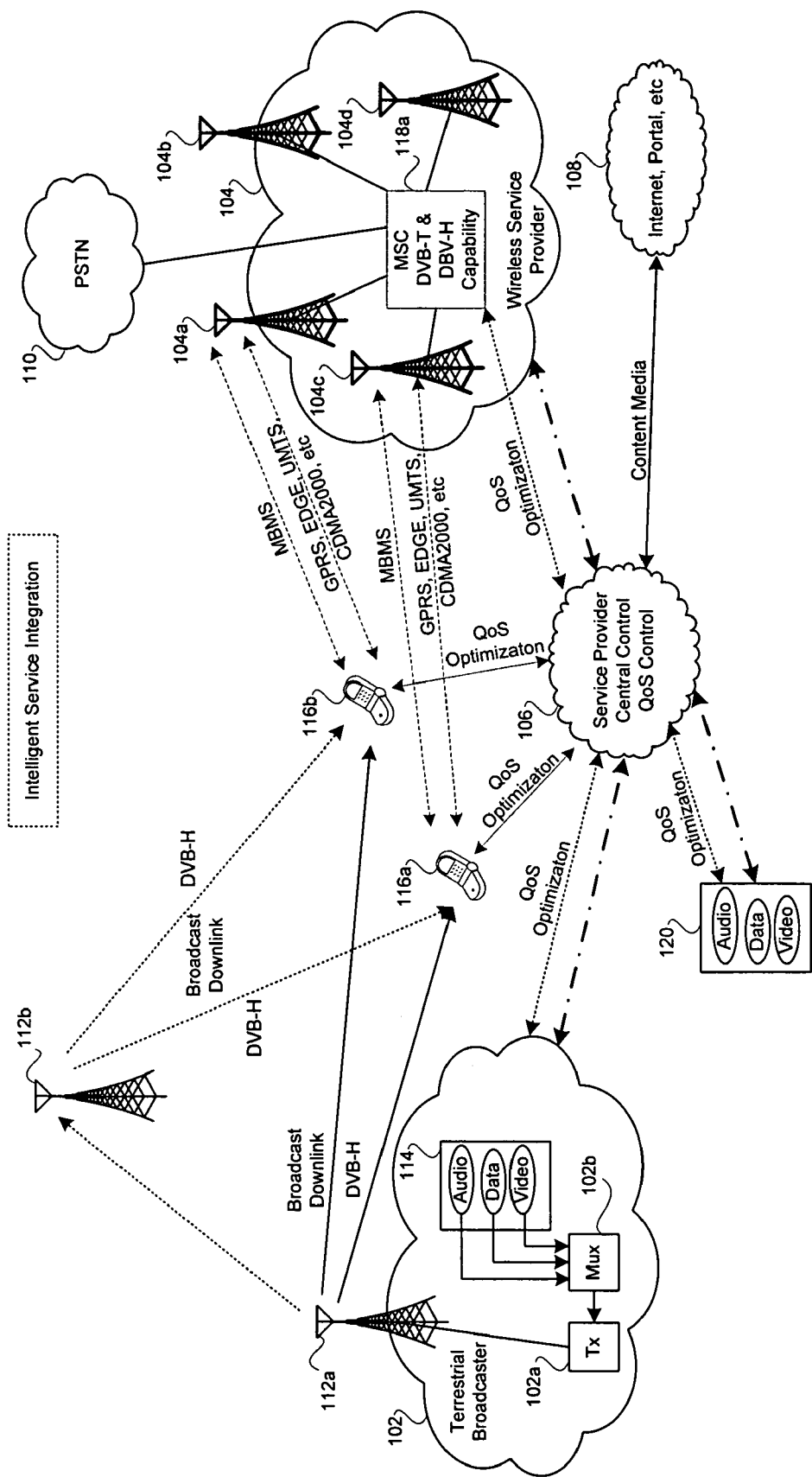
FIG. 1a is a block diagram of an exemplary system for providing integrated services between a cellular network and a digital video broadcast network, in accordance with an embodiment of the invention.

FIG. 1a is a block diagram of an exemplary system for providing integrated services between a cellular network and a digital video broadcast network, in accordance with an embodiment of the invention. Referring to FIG. 1a, there is shown terrestrial broadcaster network 102, wireless service provider network 104, service provider 106, portal 108, public switched telephone network 110, and mobile terminals (MTs) 116a and 116b. The terrestrial broadcaster network 102 may comprise transmitter (Tx) 102a, multiplexer (Mux) 102b, and information content source 114. The content source 114 may also be referred to as a data carousel, which may comprise audio, data and video content. The terrestrial broadcaster network 102 may also comprise VHF/UHF broadcast antennas 112a and 112b. The wireless service provider network 104 may comprise mobile switching center (MSC) 118a, and a plurality of cellular base stations 104a, 104b, 104c, and 104d.

The terrestrial broadcaster network 102 may comprise suitable equipment that may be adapted to encode and/or encrypt data for transmission via the transmitter 102a. The transmitter 102a in the terrestrial broadcast network 102 may be adapted to utilize VHF/UHF broadcast channels to communicate information to the mobile terminals 116a, 116b. The multiplexer 102b associated with the terrestrial broadcaster network 102 may be utilized to multiplex data from a plurality of sources. For example, the multiplexer 102b may be adapted to multiplex various types of information such as audio, video and/or data into a single pipe for transmission by the transmitter 102a. Content media from the portal 108, which may be handled by the service provider 106 may also be multiplexed by the multiplexer 102b. The portal 108 may be an ISP service provider. Although DVB is illustrated as the VHF/UHF standard, the invention is not limited in this regard. Accordingly, ATSC, ISDB or other VHF/UHF standard may be utilized.

In one aspect of the invention, the terrestrial broadcaster network 102 may be adapted to provide one or more digital television (DTV) channels to the service provider 106. In this regard, the terrestrial broadcaster network 102 may comprise suitable high-speed or broadband interfaces that may be utilized to facilitate transfer of the DTV channels from the terrestrial broadcast network 102 to the service provider. The service provider 106 may then utilize at least a portion of the DTV channels to provide television (TV) on demand service, or other similar types of services to the wireless service provider network 104. Accordingly, the service provider 106 may further comprise suitable high-speed or broadband interfaces that may be utilized to facilitate the transfer of related TV on demand information to the MSC 118a.

Although communication links between the terrestrial broadcast network 102 and the service provider 106, and also the communication links between the service provider 106 and the wireless service provider 104 may be wired communication links, the invention may be not so limited. Accordingly, at least one of these communication links may be wireless communication links. In an exemplary embodiment of the invention, at least one of these communication links may be an 802.x based communication link such as 802.16 or WiMax broadband access communication link. In another exemplary embodiment of the invention, at least one of these connections may be a broadband line of sight (LOS) connection.

The wireless service provider network 104 may be a cellular or personal communication service (PCS) provider that may be adapted to handle MBMS. The term cellular as utilized herein refers to both cellular and PCS frequencies bands. Hence, usage of the term cellular may comprise any band of frequencies that may be utilized for cellular communication and/or any band of frequencies that may be utilized for PCS communication. MBMS is a high-speed data service that is overlaid on WCDMA to provide much higher data rates than may be provided by core WCDMA. In this regard, the MBMS services may be superimposed on the cellular or PCS network.

The wireless service provider network 104 may utilize cellular or PCS access technologies such as GSM, CDMA, CDMA2000, WCDMA, AMPS, N-AMPS, and/or TDMA. The cellular network may be utilized to offer bi-directional services via uplink and downlink communication channels, while the MBMS network may be utilized to provide a unidirectional broadband services via a downlink channel. The MBMS unidirectional downlink channel may be utilized to broadcast content media and/or multimedia type information to the mobile terminals 116a and 116b. Although MBMS provides only unidirectional downlink communication, the invention may be not so limited. In this regard, other bidirectional communication methodologies comprising uplink and downlink capabilities, whether symmetric or asymmetric, may be utilized.

Although the wireless service provider network 104 is illustrated as a GSM, CDMA, WCDMA based network and/or variants thereof, the invention is not limited in this regard. Accordingly, the wireless service provider network 104 may be an 802.11 based wireless network or wireless local area network (WLAN). The wireless service provider network 104 may also be adapted to provide 802.11 based wireless communication in addition to GSM, CDMA, WCDMA, CDMA2000 based network and/or variants thereof. In this case, the mobile terminals 116a, 116b may also be compliant with the 802.11 based wireless network.

In accordance with an exemplary embodiment of the invention, if the mobile terminal (MT) 116a is within an operating range of the VHF/UHF broadcasting antenna 112a and moves out of the latter's operating range and into an operating range of the VHF/UHF broadcasting antenna 112b, then VHF/UHF broadcasting antenna 112b may be adapted to provide VHF/UHF broadcast services to the mobile terminal 116a. If the mobile terminal 116a subsequently moves back into the operating range of the VHF/UHF broadcasting antenna 112a, then the broadcasting antenna 112a may be adapted to provide VHF/UHF broadcasting service to the mobile terminal 116a. In a somewhat similar manner, if the mobile terminal (MT) 116b is within an operating range of the VHF/UHF broadcasting antenna 112b and moves out of the latter's operating range and into an operating range of the broadcasting antenna 112a, then the VHF/UHF broadcasting antenna 112a may be adapted to provide VHF/UHF broadcasting service to the mobile terminal 116b. If the mobile terminal 116b subsequently moves back into the operating range of broadcasting antenna 112b, then the VHF/UHF broadcasting antenna 112b may be adapted to provide VHF/UHF broadcast services to the mobile terminal 116b.

The service provider 106 may comprise suitable interfaces, circuitry, logic and/or code that may be adapted to facilitate communication between the terrestrial broadcasting network 102 and the wireless communication network 104. In an illustrative embodiment of the invention the service provider 106 may be adapted to utilize its interfaces to facilitate exchange control information with the terrestrial broadcast network 102 and to exchange control information with the wireless service provider 104. The control information exchanged by the service provider 106 with the terrestrial broadcasting network 102 and the wireless communication network 104 may be utilized to control certain operations of the mobile terminals, the terrestrial broadcast network 102 and the wireless communication network 104.

In accordance with an embodiment of the invention, the service provider 106 may also comprise suitable interfaces, circuitry, logic and/or code that may be adapted to handle network policy decisions. For example, the service provider 106 may be adapted to manage a load on the terrestrial broadcast network 102 and/or a load on the wireless service provider network 104. Load management may be utilized to distribute the flow of information throughout the terrestrial broadcast network 102 and/or a load on the wireless service provider network 104. For example, if information is to be broadcasted via the wireless service provider network 104 to a plurality of mobile terminals within a particular cell handled by the base station 104a and it is determined that this may overload the wireless service provider network 104, then the terrestrial broadcast network 102 may be configured to broadcast the information to the mobile terminals.

The service provider 106 may also be adapted to handle certain types of service requests, which may have originated from a mobile terminal. For example, the mobile terminal 116a may request that information be delivered to it via a downlink VHF/UHF broadcast channel. However, a downlink VHF/UHF broadcast channel may be unavailable for the delivery of the requested information. As a result, the service provider 106 may route the requested information through an MBMS channel via the base station 104c to the mobile terminal 116a. The requested information may be acquired from the content source 114 and/or the portal 108. In another example, the mobile terminal 116b may request that information be delivered to it via a downlink cellular channel. However, the service provider 106 may determine that delivery of the information is not critical and/or the cheapest way to deliver to the mobile terminal 116b is via a downlink VHF/UHF broadcast channel. As a result, the service provider 106 may route the requested information from the portal 108 or content service 114 to the mobile terminal 116*b*. The service provider 106 may also have the capability to send at least a portion of information to be delivered to, for example, mobile terminal 116*a* via the VHF/UHF broadcast channel and a remaining portion of the information to be delivered via the cellular broadcast channel.

In an embodiment of the invention, the service provider 106 may be adapted to receive and process quality of service (QoS) related information from the mobile terminals 116*a*, 116*b*, the wireless service provider 104 and/or the broadcast service provider. In an embodiment of the invention, any one of the mobile terminals 116*a*, 116*b* may request that information have a certain QoS be delivered to via a specified part or any part that may have to capability to supply the requested information.

In another embodiment of the invention, the service provider 106 may be adapted to autonomously control the QoS that is provided to the mobile terminal 116*a* and 116*b*. In this regard, the service provider 106 may be adapted to monitor, for example, condition on link that may be utilized to communicate with the mobile terminals 116*a*, and 116*b*. For example, the service provider 106 may request information related to RF channel conditions from each of the mobile terminals 116*a*, 116*b*, the wireless service provider 104 and/or the broadcast service provider 102.

The service provider 106 may also be adapted to acquire information regarding a load on the terrestrial broadcast network 102 and a load on the wireless service provider network 104. Accordingly, based on the determined load, the service provider 106 may be adapted to control how data may be routed over the terrestrial broadcast network 102 and/or the wireless service provider network 104 utilizing QoS related information. For example, if the service provider 106 determines that the wireless service provider 104 is congested, then most of the requested information that is to be delivered to the mobile terminal 116*a* may be delivered via the terrestrial broadcast service provider 102. If the service provider 106 determines that the terrestrial broadcast service provider 102 is congested, then most of the requested information that is to be delivered to the mobile terminal 116*a* may be delivered via the wireless service provider 104. The service provider 106 may also be adapted to partition delivery of requested information to the mobile terminal 116*a*. In this regard, based on a load on the wireless service provider 104 and the terrestrial service provider 102, a portion of requested information may be routed through the wireless service provider 104 to the mobile terminal 116*a* and at least a remaining portion of the requested information may be routed through the terrestrial service provider 102 to the mobile terminal 116*a*.

The portal 108 may comprise suitable logic, circuitry and/or code that may be adapted to provide content media to the service provider 106 via one or more communication links. These communication links, although not shown, may comprise wired and/or wireless communication links. The content media that may be provided by the portal 108 may comprise audio, data, video or any combination thereof. In this regard, the portal 108 may be adapted to provide one or more specialized information services to the service provider 106.

The public switched telephone network (PSTN) 110 may be coupled to the MSC 118*a*. Accordingly, the MSC 118*a* may be adapted to switch calls originating from within the PSTN 110 to one or more mobile terminals serviced by the wireless service provider 104. Similarly, the MSC 118*a* may be adapted to switch calls originating from mobile terminals serviced by the wireless service provider 104 to one or more telephones serviced by the PSTN 110.

The information content source 114 may comprise a data carousel. In this regard, the information content source 114 may be adapted to provide various information services, which may comprise online data including audio, video and data content. The information content source 114 may also comprise file download, and software download capabilities. In instances where a mobile terminal fails to acquire requested information from the information content source 114 or the requested information is unavailable, then the mobile terminal may acquire the requested information via, for example, MBMS from the portal 108. The request may be initiated through an uplink cellular communication path.

The mobile terminals (MTs) 116*a* and 116*b* may comprise suitable logic, circuitry and/or code that may be adapted to handle the processing of uplink and downlink cellular channels for various access technologies and broadcast VHF/UHF technologies. In an exemplary embodiment of the invention, the mobile terminals 116*a*, 116*b* may be adapted to utilize one or more cellular access technologies such as GSM, GPRS, EDGE, CDMA, WCDMA, CDMA2000, HSDPA and MBMS. The mobile terminal may also be adapted to receive and process VHF/UHF broadcast signals in the VHF/UHF bands. For example, a mobile terminal may be adapted to receive and process DVB-H signals. A mobile terminal may be adapted to request information via a first cellular service and in response, receive corresponding information via a VHF/UHF broadcast service. A mobile terminal may also be adapted to request information from a service provider via a cellular service and in response, receive corresponding information via a data service, which is provided via the cellular service. The mobile terminals may also be adapted to receive VHF/UHF broadcast information from either the base stations 104*a*, 104*b*, 104*c*, 104*d* or the VHF/UHF broadcast antennas 112*a* and 112*b*. In instances where a mobile terminal receives broadcast information from any of the base stations 104*a*, 104*b*, 104*c*, or 104*d* via a downlink MBMS communication channel, then the mobile terminal may communicate corresponding uplink information via an uplink cellular communication channel.

In one embodiment of the invention, a mobile terminal may be adapted to utilize a plurality of broadcast integrated circuits for receiving and processing VHF/UHF channels, and a plurality of cellular integrated circuits for receiving and processing cellular or PCS channels. In this regard, the plurality of cellular integrated circuits may be adapted to handle different cellular access technologies. For example, at least one of the cellular integrated circuits may be adapted to handle GSM, and at least one of the cellular integrated circuits may be adapted to handle WCDMA. For broadcast channels, each of the plurality of broadcast integrated circuits may be adapted to handle at least one VH/UHF channel.

In another embodiment of the invention, a mobile terminal may be adapted to utilize a single broadcast integrated circuit for receiving and processing VHF/UHF channels, and a single cellular integrated circuit for receiving and processing cellular or PCS channels. In this regard, the single cellular integrated circuit may be adapted to handle different cellular access technologies. For example, at least one of the cellular integrated circuit may be adapted to handle GSM, and at least one of the cellular integrated circuits may be adapted to handle WCDMA. For broadcast channels, the single broadcast integrated circuit may be adapted to handle at least one VH/UHF channel. Each of the mobile terminals may comprise a single memory interface that may be adapted to handle processing of the broadcast communication information and processing of cellular communication information. In this regard, an uplink cellular communication path may be utilized to facilitate receiving of broadcast information via a broadcast communication path.

In another embodiment of the invention, a mobile terminal may be adapted to utilize a single integrated circuit for receiving and processing broadcast VHF/UHF channels, and for receiving and processing cellular or PCS channels. In this regard, the single broadcast and cellular integrated circuit may be adapted to handle different cellular access technologies. For example, the single integrated circuit may comprise a plurality of modules each of which may be adapted to receive and process a particular cellular access technology or a VHF/UHF broadcast channel. Accordingly, a first module may be adapted to handle GSM, a second module may be adapted to handle WCDMA, and a third module may be adapted to handle at least one VHF/UHF channel.

Figure 1B:
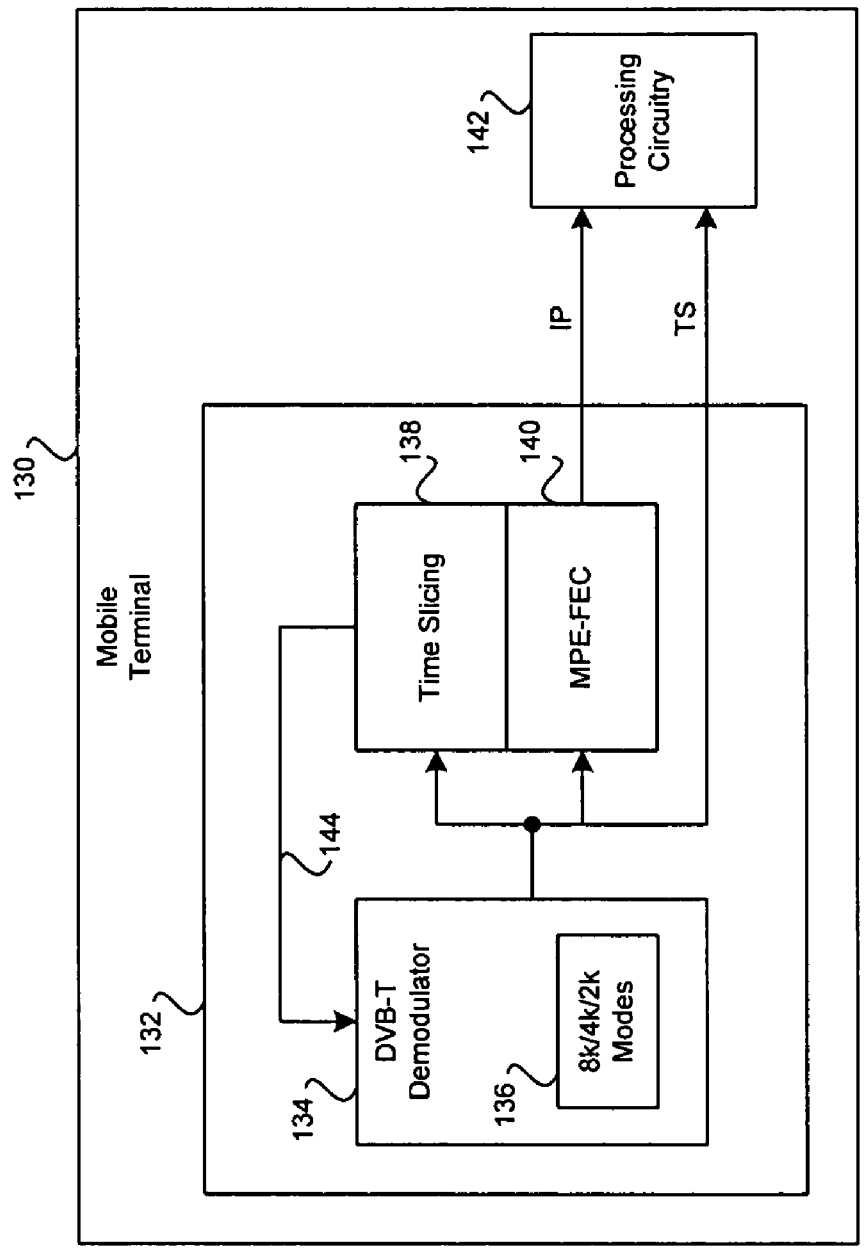
FIG. 1b is a high-level block diagram of exemplary DVB-H receiver circuitry in a mobile terminal, which may be utilized in connection with an embodiment of the invention.

FIG. 1b is a high-level block diagram of exemplary DVB-H receiver circuitry in a mobile terminal, which may be utilized in connection with an embodiment of the invention. Referring to FIG. 1e, there is shown a mobile terminal 130. The mobile terminal 130 may comprise a DVB-H demodulator 132 and processing circuitry block 142. The DVB-H demodulator block 132 may comprise a DVB-T demodulator 134, time slicing block 138, and MPE-FEC block 140.

The DVB-T demodulator 134 may comprise suitable circuitry, logic and/or code that may be adapted to demodulate a terrestrial DVB signal. In this regard, the DVB-T demodulator 134 may be adapted to downconvert a received DVB-T signal to a suitable bit rate that may be handled by the mobile terminal 130. The DVB-T demodulator may be adapted to handle 2k, 4k and/or 8k modes.

The time slicing block 138 may comprise suitable circuitry, logic and/or code that may be adapted to minimize power consumption in the mobile terminal 130, particularly in the DVB-T demodulator 134. In general, time slicing reduces average power consumption in the mobile terminal by sending data in bursts via much higher instantaneous bit rates. In order to inform the DVB-T demodulator 134 when a next burst is going to be sent, a delta indicating the start of the next burst is transmitted within a current burst. During transmission, no data for an elementary stream (ES) is transmitted so as to allow other elementary streams to optimally share the bandwidth. Since the DVB-T demodulator 134 knows when the next burst will be received, the DVB-T demodulator 134 may enter a power saving mode between bursts in order to consume less power. Reference 144 indicates a control mechanism that handles the DVB-T demodulator 134 power via the time slicing block 138. The DVB-T demodulator 134 may also be adapted to utilize time slicing to monitor different transport streams from different channels. For example, the DVB-T demodulator 134 may utilize time slicing to monitor neighboring channels between bursts to optimize handover.

The MPE-FEC block 140 may comprise suitable circuitry, logic and/or code that may be adapted to provide error correction during decoding. On the encoding side, MPE-FEC encoding provides improved carrier to noise ratio (C/N), improved Doppler performance, and improved tolerance to interference resulting from impulse noise. During decoding, the MPE-FEC block 140 may be adapted to determine parity information from previously MPE-FEC encoded datagrams. As a result, during decoding, the MPE-FEC block 140 may generate datagrams that are error-free even in instances when received channel conditions are poor. The processing circuitry block 142 may comprise suitable processor, circuitry, logic and/or code that may be adapted to process IP datagrams generated from an output of the MPE-FEC block 140. The processing circuitry block 142 may also be adapted to process transport stream packets from the DVB-T demodulator 134.

In operation, the DVB-T demodulator 134 may be adapted to receive an input DVB-T RF signal, demodulate the received input DVB-T RF signal so as to generate data at a much lower bit rate. In this regard, the DVB-T demodulator 134 recovers MPEG-2 transport stream (TS) packets from the input DVB-T RF signal. The MPE-FEC block 140 may then correct any error that may be located in the data and the resulting IP datagrams may be sent to the processing circuitry block 142 for processing. Transport stream packets from the DVB-T demodulator 134 may also be communicated to the processing circuitry block 142 for processing.

Figure 1C:
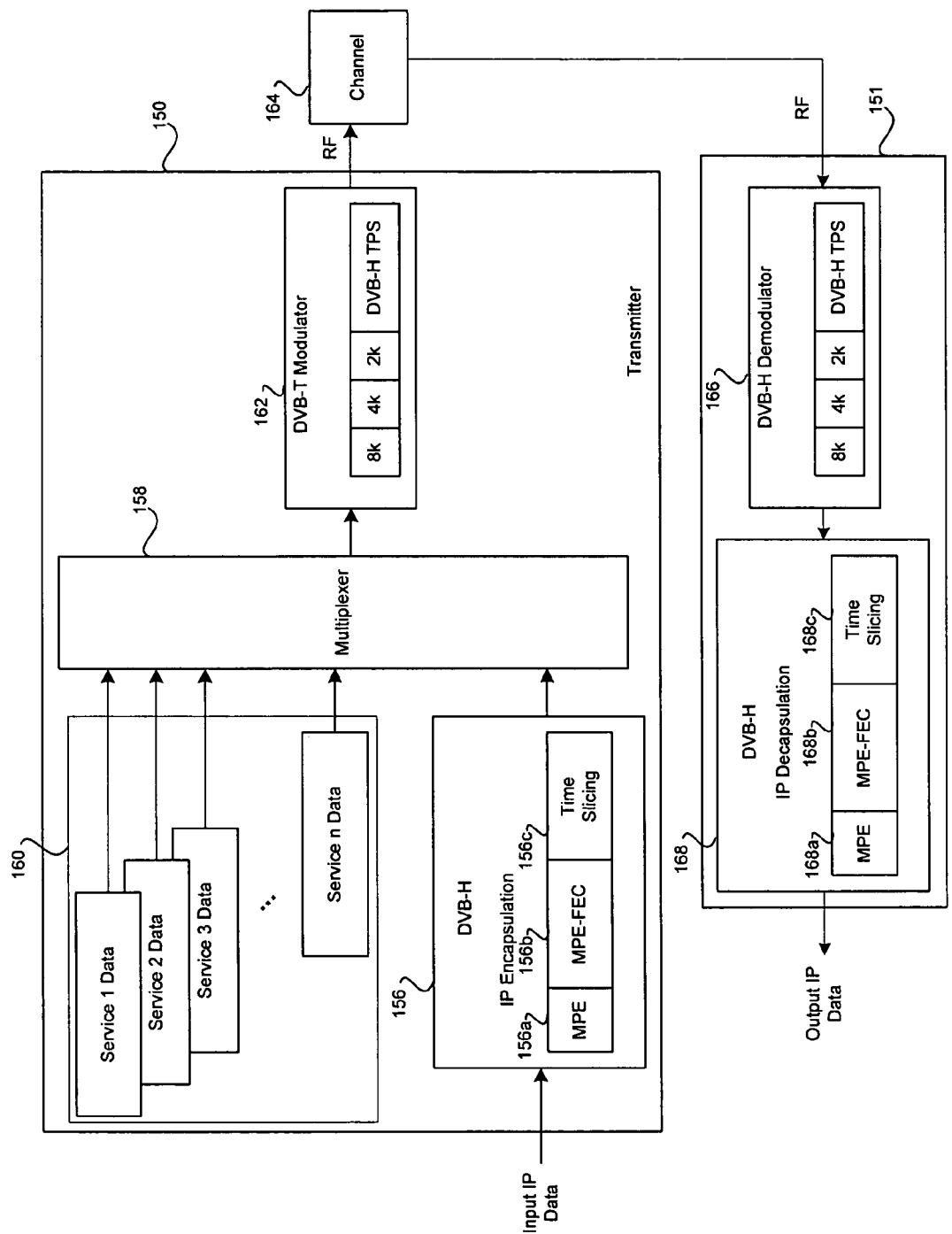
FIG. 1c is a block diagram illustrating the sharing of a multiplexer (MUX) by a plurality of MPEG2 services, which may be utilized in connection with an embodiment of the invention.

FIG. 1c is a block diagram illustrating the sharing of a multiplexer (MUX) by a plurality of MPEG2 services, which may be utilized in connection with an embodiment of the invention. Referring to FIG. 1f, there is shown a transmitter block 150, a receiver block 151 and a channel 164. The transmitter block 150 may comprise a DVB-H encapsulator block 156, a multiplexer 158, and a DVB-T modulator 162. Also shown associated with the transmitter block 150 is a plurality of service data collectively referenced as 160. The receiver block 151 may comprise a DVB-H demodulator block 166 and a DVB-H decapsulation block 168.

The DVB-H encapsulator block 156 may comprise MPE block 156a, MPE-FEC block 156b and time slicing block 156c.

The multiplexer 156 may comprise suitable logic circuitry and/or code that may be adapted to handle multiplexing of IP encapsulated DVB-H data and service data. The plurality of service data collectively referenced as 160 may comprise MPEG-2 formatted data, which may comprise for example, audio, video and/or data.

The DVB-T modulator 162 may comprise suitable logic circuitry and/or code that may be adapted to generate an output RF signal from the transmitter block 150.

The DVB-H demodulator block 166 associated with the receiver block 151 is similar to the DVB-H demodulator block 132 of FIG. 1e. The DVB-H decapsulation block 168 may comprise MPE block 168a, MPE-FEC block 168b and time slicing block 168c. The DVB-H decapsulation block 168 may comprise suitable logic, circuitry and/or code that may be adapted decapsulate the IP data that was encapsulated and multiplexed by the transmitter block 150. The output of the DVB-H demodulator 166 is the transport stream packets, which comprised the multiplexed output generated by the multiplexer 158.

Figure 2A:
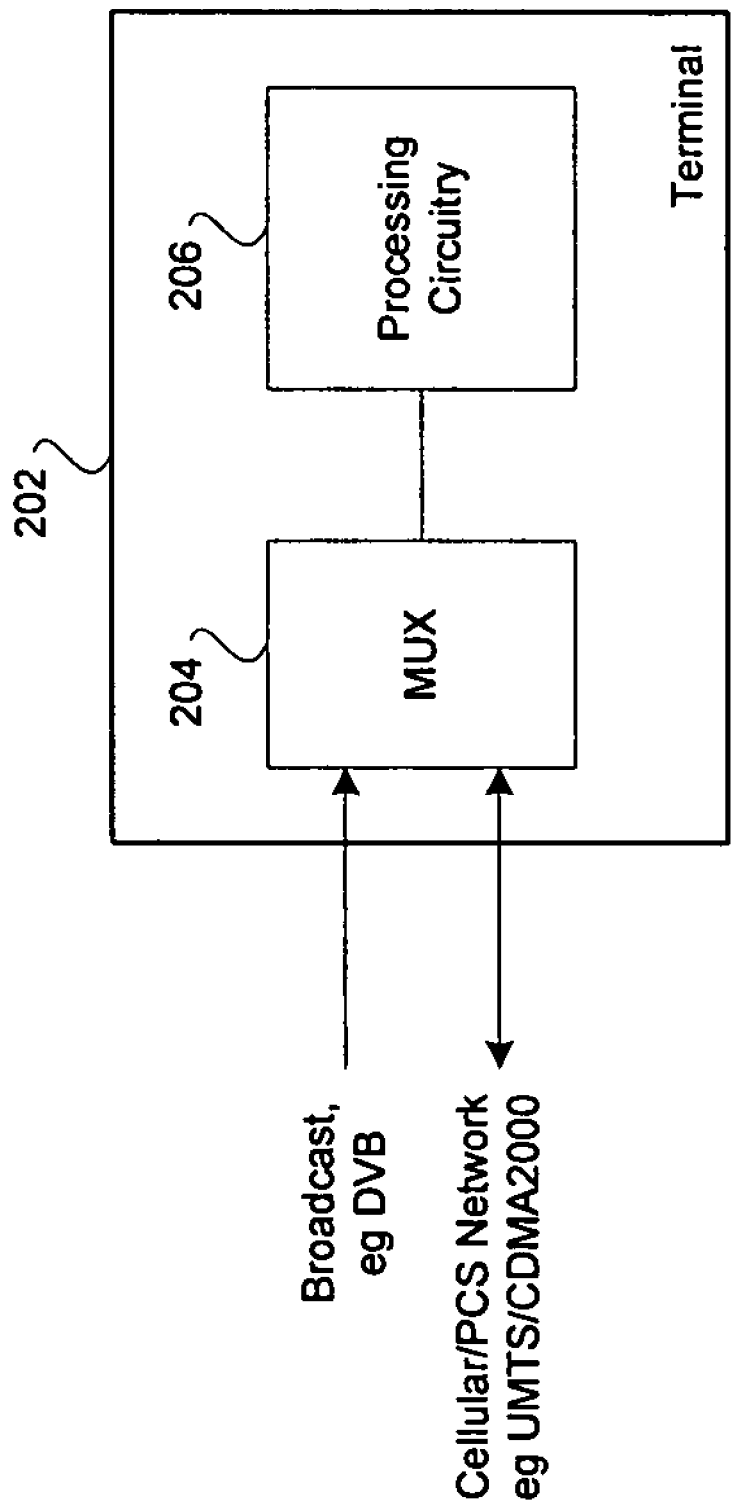
FIG. 2a is a block diagram of a mobile terminal that is adapted to receive VHF/UHF broadcasts and cellular communications, in accordance with an embodiment of the invention.

FIG. 2a is a block diagram of a mobile terminal that is adapted to receive VHF/UHF broadcasts and cellular communications, in accordance with an embodiment of the invention. Referring to FIG. 2a, there is shown mobile terminal (MT) or handset 202. The mobile terminal 202 may comprise multiplexer (MUX) 204 and processing circuitry 206.

The multiplexer 204 may comprise suitable logic circuitry and/or code that may be adapted to multiplex incoming signals, which may comprise VHF/UHF broadcast channel and at least one cellular channel. The cellular channel may be within the range of both cellular and PCS frequency bands.

The processing circuitry 206 may comprise, for example, an RF integrated circuit (RFIC) or RF front end (RFFE). In this regard, the processing circuitry 206 may comprise at least one receiver front end (RFE) circuit. A first of these circuits may be adapted to handle processing of the VHF/UHF broadcast channel and a second of these circuits may be adapted to handle a cellular channel. In an embodiment of the invention, a single RFIC may comprise a plurality of RFE processing circuits, each of which may be adapted to process a particular cellular channel. Accordingly, a single RFIC comprising a plurality of cellular RFE processing circuits may be adapted to handle a plurality of cellular channels. In one embodiment of the invention, a plurality of VHF/UHF RFE processing circuits may be integrated in a single RFIC. In this regard, a mobile terminal may be adapted to simultaneously handle a plurality of different VHF/UHF channels. For example, a mobile terminal may be adapted to simultaneously receive a first VHF/UHF channel bearing video and a second VHF/UHF channel bearing audio.

Figure 2B:
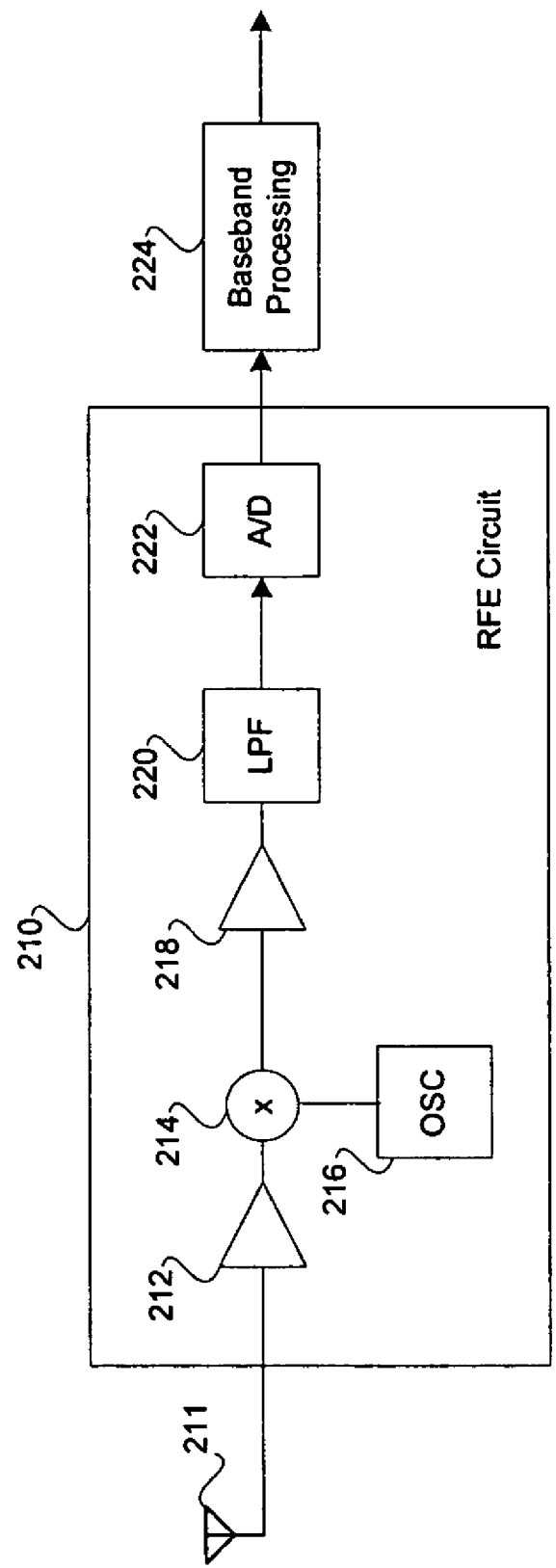
FIG. 2b is a block diagram illustrating receive processing circuit of an RF integrated circuit (RFIC), in accordance with an embodiment of the invention.

FIG. 2b is a block diagram illustrating receive processing circuit of an RF integrated circuit (RFIC), in accordance with an embodiment of the invention. Referring to FIG. 2b, there is shown antenna 211, receiver front end (RFE) circuit 210, and baseband processing block 224. The receiver front end (RFE) circuit 210 may comprise a low noise amplifier (LNA) 212, a mixer 214, an oscillator 216, a low noise amplifier or amplifier or amplifier 218, a low pass filter 220 and an analog-to-digital converter (A/D) 222.

The antenna 211 may be adapted to receive at least one of a plurality of signals. For example, the antenna 211 may be adapted to receive a plurality of signals in the GSM band, a plurality of signals in the WCDMA and and/or a plurality of signals in the VHF/UHF band. U.S. application Ser. Nos. 11/010,883, 11/011,006, 11/010,487, all of which are filed on even date herewith and disclose various antenna configurations that may be utilized for a plurality of operating frequency bands.

The receiver front end (RFE) circuit 210 may comprise suitable circuitry, logic and/or code that may be adapted to convert a received RF signal down to baseband. An input of the low noise amplifier 212 may be coupled to the antenna 211 so that it may receive RF signals from the antenna 211. The low noise amplifier 212 may comprise suitable logic, circuitry, and/or code that may be adapted to receive an input RF signal from the antenna 211 and amplify the received RF signal in such a manner that an output signal generated by the low noise amplifier 212 has a very little additional noise.

The mixer 214 in the RFE circuit 210 may comprise suitable circuitry and/or logic that may be adapted to mix an output of the low noise amplifier 212 with an oscillator signal generated by the oscillator 216. The oscillator 216 may comprise suitable circuitry and/or logic that may be adapted to provide a oscillating signal that may be adapted to mix the output signal generated from the output of the low noise amplifier 212 down to a baseband. The low noise amplifier (LNA) or amplifier 218 may comprise suitable circuitry and/or logic that may be adapted to low noise amplify and output signal generated by the mixer 214. An output of the low noise amplifier or amplifier 218 may be communicated to the low pass filter 220. The low pass filter 220 may comprise suitable logic, circuitry and/or code that may be adapted to low pass filter the output signal generated from the output of the low noise amplifier 220. The low pass filter block 220 retains a desired signal and filters out unwanted signal components such as higher signal components comprising noise. An output of the low pass filter 220 may be communicated to the analog-digital-converter for processing.

The analog-to-digital converter (A/D) 222 may comprise suitable logic, circuitry and/or code that may be adapted to convert the analog signal generated from the output of the low pass filter 220 to a digital signal. The analog-to-digital converter 222 may generate a sampled digital representation of the low pass filtered signal that may be communicated to the baseband-processing block 224 for processing. The baseband processing block 224 may comprise suitable logic, circuitry and/or code that may be adapted to process digital baseband signals received from an output of the A/D 222. Although the A/D 222 is illustrated as part of the RFE circuit 210, the invention may not be so limited. Accordingly, the A/D 222 may be integrated as part of the baseband processing block 224. In operation, the RFE circuit 210 is adapted to receive RF signals via antenna 211 and convert the received RF signals to a sampled digital representation, which may be communicated to the baseband processing block 224 for processing.

Figure 3A:
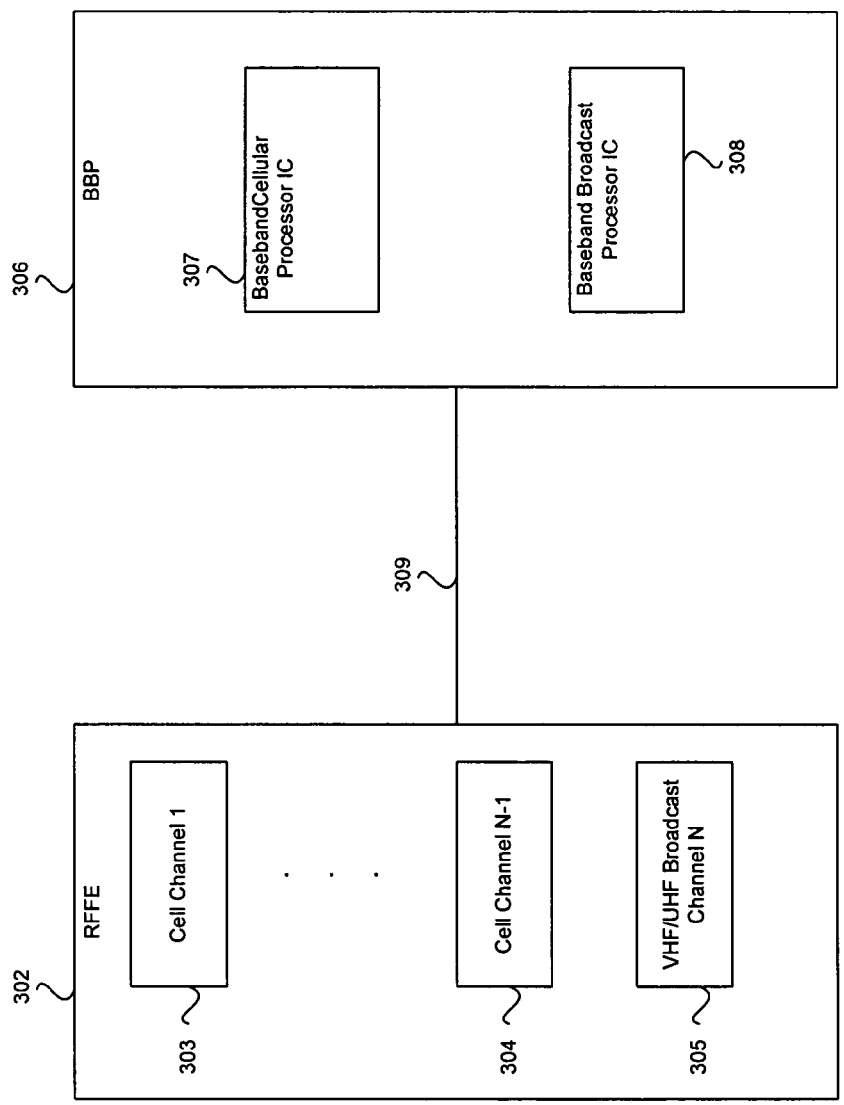
FIG. 3a is a block diagram illustrating an exemplary radio frequency front end (RFFE) and baseband processor (BBP), in accordance with an embodiment of the invention.

FIG. 3a is a block diagram illustrating an exemplary radio frequency front end (RFFE) and baseband processor (BBP), in accordance with an embodiment of the invention. Referring to FIG. 3a, there is shown an RFFE 302 and a BBP 306. The RFFE 302 and the BBP 306 may exchange baseband signals across a channel interface 309. The RFFE 302 may comprise a plurality of N−1 cellular RFFE processing circuits 1, . . . (N−1) referenced as 303 . . . 304, and a VHF/UHF broadcast RFFE processing circuit referenced as 305. Each of the plurality of N−1 cellular RFFE processing circuits 303, . . . ,304 may individually receive radio frequency (RF) signals associated with at least one of a plurality of cellular frequency band communications services comprising GSM, GPRS, EDGE, W-CDMA, HSDPA, and MBMS. The VHF/UHF broadcast RFFE processing circuit 305 may select from a plurality of channels in the VHF or UHF bands. The VHF/UHF channel 305 may be adapted to simultaneously receive a plurality of VHF/UHF channels. The plurality of N−1 cellular RFFE processing circuits 303, . . . ,304 may processes RF signals, at cellular frequency band channel frequencies received from an antenna, to baseband frequency. The VHF/UHF channel 305 may process RF signals, at VHF/UHF band channel frequencies to baseband frequency. The RFFE processing circuits 303, . . . ,304, and 305 may be implemented in a plurality of radio frequency ICs (RFICs).

The BBP 306 may comprise a single baseband cellular processor IC 307, and a single baseband broadcast processor IC 308. The single baseband cellular processor IC 307 may process baseband signals associated with the plurality of N−1 cellular RFFE processing circuits 303, . . . ,304. The single baseband broadcast processor IC 308 may process baseband signals associated with the VHF/UHF broadcast channel 305. The single baseband broadcast processor IC 308 may also process multiprotocol encapsulated (MPE) data sent in a datacast over a broadcast network. The processed signals from the single baseband cellular processor IC 307, and the single broadcast processor IC 308 may be presented to a user of a mobile terminal via an input/output device. The baseband cellular processor IC 307 and baseband broadcast processor IC 308 may have interactions at the mobile terminal input/output device.

Figure 3B:
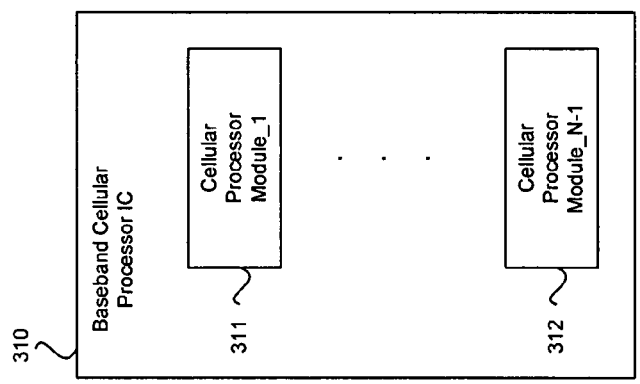
FIG. 3b is a block diagram illustrating an exemplary cellular processor integrated circuit (IC), such as, for example, the single cellular processor IC of FIG. 3a, in accordance with an embodiment of the invention.

FIG. 3b is a block diagram illustrating an exemplary cellular processor integrated circuit (IC), such as, for example, the single cellular processor IC of FIG. 3a, in accordance with an embodiment of the invention. Referring to FIG. 3b, there is shown the single baseband cellular processor IC 310, which comprises a plurality of N−1 cellular processor modules 311, . . . ,312. The plurality of N−1 cellular processor modules 311, . . . ,312 may comprise suitable logic, circuitry and/or code to process at least one of a plurality of baseband signals associated with cellular frequency band communications services. Each of the N−1 cellular processor modules 311, . . . , 312 may individually process baseband signals associated with at least one of a plurality of cellular frequency band communications services comprising GSM, GPRS, EDGE, W-CDMA, HSDPA, and MBMS.

Figure 3C:
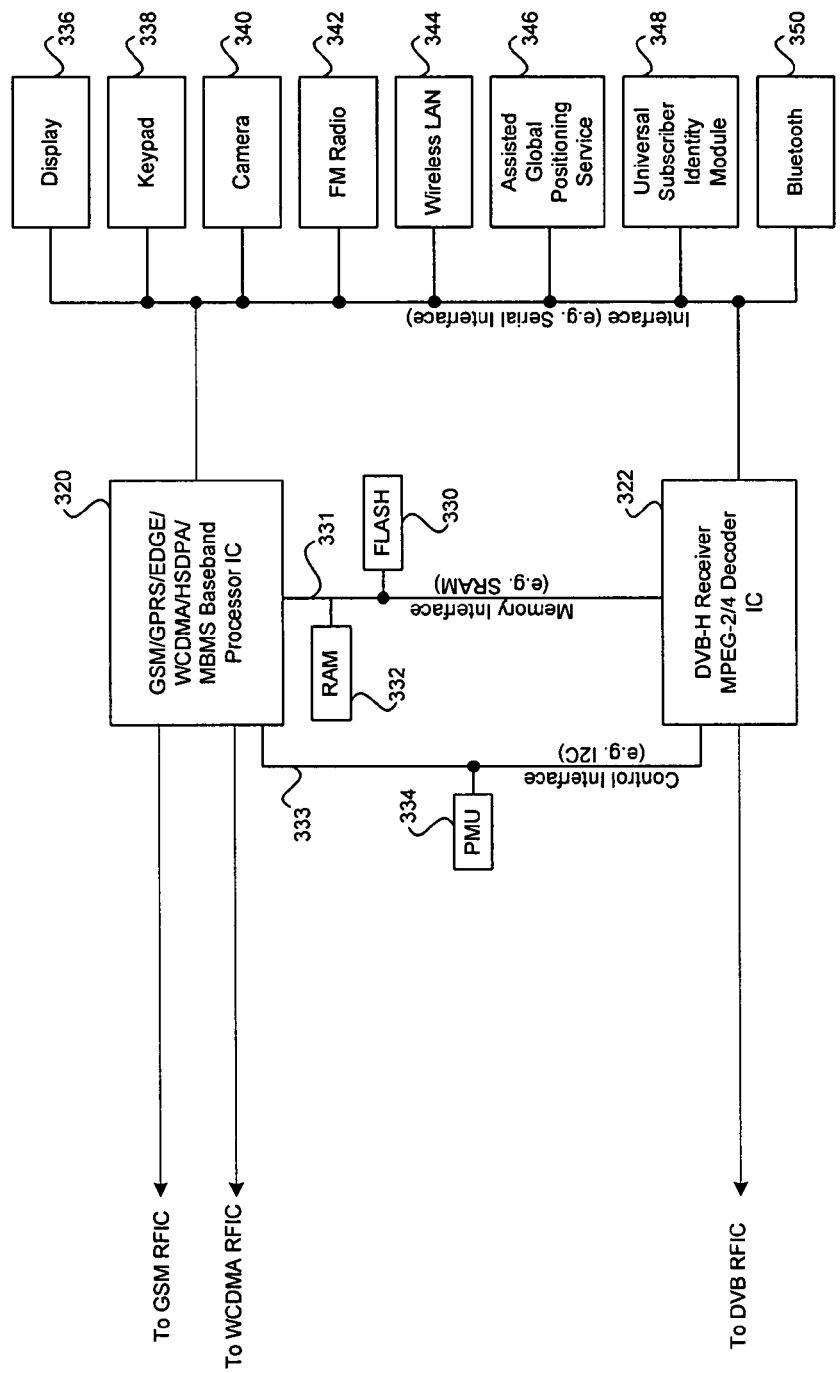
FIG. 3c is a block diagram illustrating an exemplary connection of baseband cellular processor IC and a baseband broadcast processor IC, in accordance with an embodiment of the invention.

FIG. 3c is a block diagram illustrating an exemplary connection of a baseband cellular processor IC, and a baseband broadcast processor IC, in accordance with an embodiment of the invention. Referring to FIG. 3c, there is shown a baseband cellular processor IC such as a GSM/GPRS/EDGE/WCDMA/HSDPA/MBMS baseband processor IC 320, and a baseband broadcast processor IC such as a DVB-H receiver IC. FIG. 3c also comprises a FLASH memory 330, random access memory (RAM) 332, a memory interface 331, a power management unit (PMU) 334, a control interface 333, and a plurality of peripherals display 336, keypad 338, camera 340, frequency modulation (FM) radio 342, wireless local area network (WLAN) 344, assisted global positioning service (A-GPS) 346, universal subscriber identity module (USIM) 348, and Bluetooth 350. The baseband cellular processor IC 320 may communicate over the channel interface with a cellular RFIC such as the GSM RFIC, and/or a W-CDMA RFIC. The baseband broadcast processor IC 322 may communicate over the channel interface with a broadcast RFIC such as the DVB RFIC.

The FLASH memory 330 may comprise suitable logic and/or circuitry that may be adapted to store data and/or code in a non-volatile manner, where each memory address may be written multiple times, and the contents of each memory address may be randomly accessed. The RAM 332 may comprise suitable logic and/or circuitry that may be adapted for storing data and/or code in a volatile manner, where each memory address may be written multiple times, and each memory address may be randomly accessed for read and write operations. The memory interface 331, may comprise suitable logic and/or circuitry that may adapted to enable communication between the baseband processor IC 320 and FLASH memory 330, and between the baseband processor IC 320 and RAM 332. The memory interface 331 may further enable communication between the baseband processor IC 322 and FLASH memory 330 and between the baseband processor IC 322 and RAM 332. The memory interface 331 may be, for example, a serial RAM (SRAM) interface. Notwithstanding, the SRAM interface may comprise a serial communication link between the baseband processor IC 320 and FLASH memory 330 and RAM 332.

The PMU 334 may comprise suitable logic, circuitry and/or code that may be adapted to manage of power consumption for various devices. The control interface 333 may comprise suitable logic and/or circuitry that may be adapted to enable communication between the baseband processor IC 320 and the PMU 334, and between the baseband processor IC 322 and the PMU 334. An exemplary aspect of the control interface 333 may be the inter-integrated circuit (I²C) bus. The I²C bus may comprise a serial communication link between IC devices. The PMU may use the control bus to instruct at least one of baseband processor IC 320, and baseband processor IC 322 to temporarily shut down some operational modes to reduce power consumption to extend battery life in a mobile terminal.

The plurality of peripherals 336, 338, 340, 342, 344, 346, 348, and 350 may provide input to or receive output from at least one of the baseband cellular processor IC 320, and the baseband broadcast processor IC 322. For example, the peripheral 344 may provide communication access to a wireless local area network (WLAN) and the peripheral 350 may provide communication access to Bluetooth devices. The peripheral 348 may be a universal subscriber identity module (USIM), in which the USIM may contain relevant information that enable a user to receiver services from a GSM and/or UMTS network. An interface may couple baseband cellular processor IC 320, baseband broadcast processor IC 322, and the plurality of peripherals 336, 338, 340, 342, 344, 346, 348, and 350. The interface may comprise suitable logic and/or circuitry that may be adapted to enable communication between the baseband cellular processor IC 320 and at least one of the plurality of peripherals 336, 338, 340, 342, 344, 346, 348, and 350. The interface may also be adapted to enable communication between the baseband broadcast processor IC 322 and at least one of the plurality of peripherals 336, 338, 340, 342, 344, 346, 348, and 350. An exemplary aspect of this interface is a serial interface.

Each of the baseband cellular processor IC 320 and the baseband broadcast processor IC 322 may communicate with any of the plurality of peripherals 336, 338, 340, 342, 344, 346, 348, and 350. Consequently, there is may be interactions between the single baseband cellular processor IC 320, and the single baseband broadcast processor IC 322 in at least one of the peripherals 336, 338, 340, 342, 344, 346, 348 and 350. For example, the keypad 338 may be utilized by a user to initiate requests for at least one of cellular frequency band communications services and VHF/UHF broadcast services. Similarly, the display 336 may present output to the user from at least one of cellular frequency broadcast services and VHF/UHF broadcast services.

The RAM 332 and the FLASH memory 330 may be accessible by the baseband processor IC 320 and by the baseband processor IC 322 via the memory interface 331. The FLASH 330 may contain machine-readable code may be executed by processor IC 320 within a mobile terminal to perform tasks related to the execution of signaling protocols with a cellular communications network for the establishment of cellular frequency band communication services between the mobile terminal and a cellular communications network. The FLASH 330 may also store persistent data which are to be maintained at a mobile terminal even after the mobile terminal has been powered off and subsequently powered on. Exemplary persistent data at a mobile terminal may comprise a telephone number, or other information used by a network to uniquely identify the mobile terminal. The RAM 332 may be used by the baseband processor IC 320 to store non-persistent data which may be lost if the mobile terminal is powered off and subsequently powered on. Exemplary non-persistent data may comprise data utilized to maintain connection states for active connections. Such information may be deleted from memory upon termination of the associated connection to the network.

The GSM/GRPS/EDGE/WCDMA/HSDPA/MBMS baseband processor IC 320 may process baseband signals associated with a plurality of cellular frequency band communications services. The DBV-H receiver and MPEG-2/4 decoder IC 322 may process baseband signals associated with VHF/UHF band broadcast services. The baseband processor IC 322 may also process multiprotocol encapsulated (MPE) data sent in a datacast over a broadcast network. The processed signals from the baseband cellular processor IC 320, and the baseband broadcast processor IC 322 may be presented to a user of a mobile terminal via an input/output device.

Figure 3D:
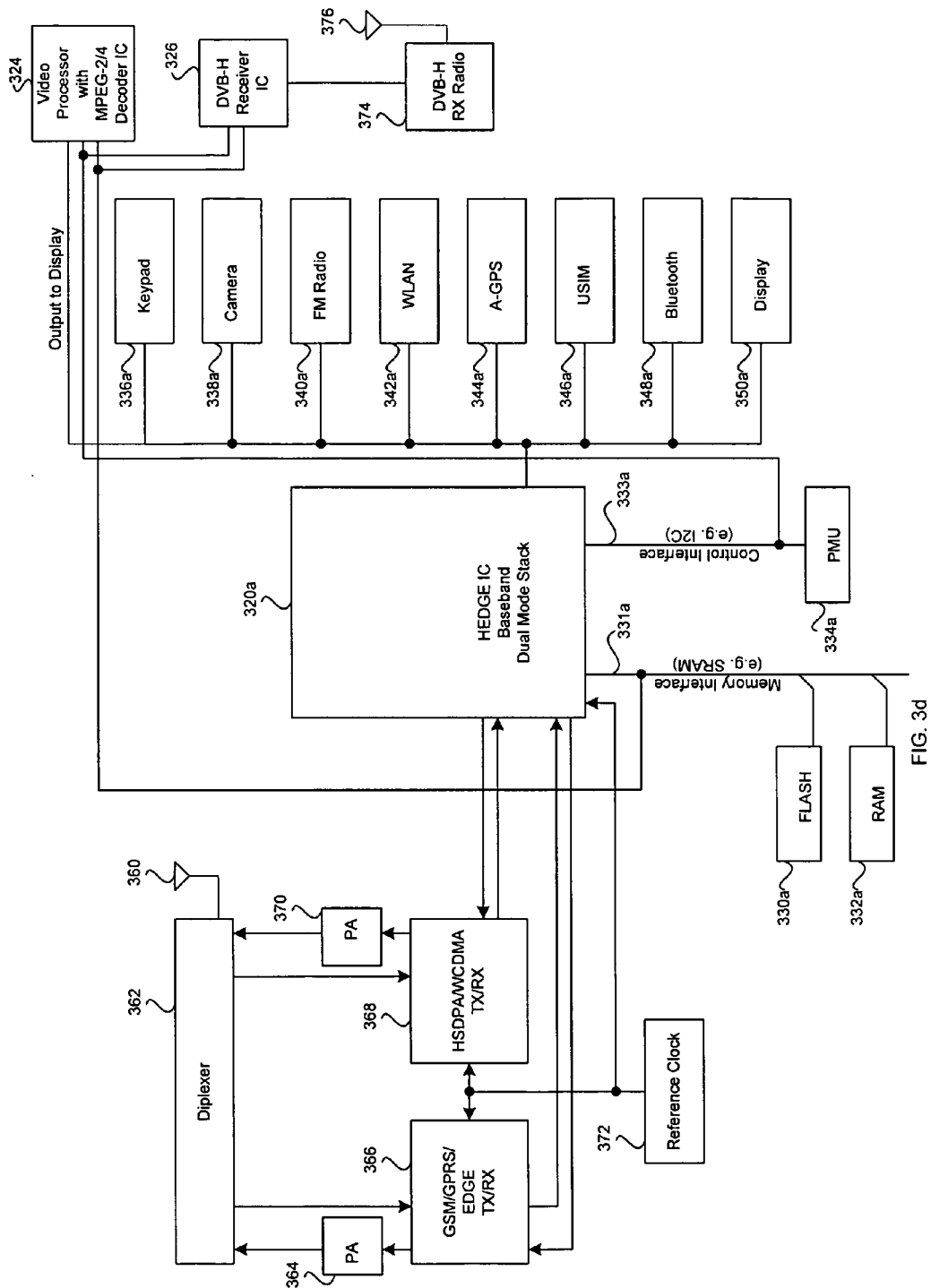
FIG. 3d is a block diagram illustrating an exemplary processing circuit for a mobile terminal, in accordance with an embodiment of the invention.

FIG. 3d is a block diagram illustrating an exemplary processing circuit for a mobile terminal, in accordance with an embodiment of the invention. Referring to FIG. 3d, there is shown a HEDGE baseband processor IC 320a, a video processor with MPEG-2/4 decoder IC 324, a DVB-H receiver IC 326, a FLASH memory 330a, a RAM 332a, a PMU 334a, and a plurality of peripherals 336a, 338a, 340a, 342a, 344a, 346a, 348a, and 350a. FIG. 3d further comprises antennas 360 and 376, a diplexer 362, power amplifiers (PAs) 364 and 370, the GSM/GPRS/EDGE RFFE 366, the HSDPA/WCDMA RFFE 368, DVB-H receiver front end (RFE) 374, and a reference clock 372. The HEDGE baseband processor IC 320a is an exemplary aspect of the single cellular processor IC referred as 307 in FIG. 3a.

The antennas 360 and 376 may comprise suitable interface logic and/or circuitry that may be adapted to receive and transmit RF signals. The diplexer 362 may comprise suitable logic and/or circuitry that may be adapted to isolate received signals from transmitted signals. This may prevent received signals from being corrupted by the much stronger transmitted signals. The diplexer 362 may also allow transmission of signals from multiple RFFEs, for example, RFFEs 366 and 368, to the same transmission antenna, for example, antenna 360.

The reference clock 372 may comprise suitable logic and/or circuitry that may be adapted to provide a clocking signal to the RFFEs 366 and 368, and to the HEDGE baseband processor IC 320a. The clocking signal may be utilized by various devices, for example, analog-to-digital converters, digital-to-analog converters, and latching devices that may receive digital data. The PAs 364 and 370 may comprise suitable logic and/or circuitry that may be adapted to amplify an analog signal sufficiently so that when the analog signal is transmitted by an antenna, for example, antenna 360 or 376, the transmitted signal may have sufficient strength that it may appear as a valid signal to a device receiving the transmitted signal, for example, a cellular base station.

The RFFEs 366 and 368 may comprise suitable logic, circuitry and/or code that may be adapted to receive a digital baseband signal, convert it to an analog signal and upconvert it to RF frequency so that it may be transmitted by an antenna, for example the antenna 360. The RFFEs 366 and 368 and the RFE 374 may comprise suitable logic, circuitry and/or code that may be adapted to receive a RF signal from an antenna, for example, antenna 376, downconvert it to an analog baseband signal and convert the analog baseband signal to a digital baseband signal.

The FLASH memory 330a may comprise suitable logic and/or circuitry that may be adapted to store data and/or code in a non-volatile manner, where each memory location may be written multiple times, and the contents of each memory location may be randomly accessed. The RAM 332a may comprise suitable logic and/or circuitry that may be adapted for storing data and/or code in a volatile manner, where each memory location may be written multiple times, and each memory location may be randomly accessed for read and write operations. The memory interface 331a, may comprise suitable logic and/or circuitry that may be adapted to enable communication between the baseband processor IC 320a and FLASH memory 330a, and between the baseband processor IC 320a and RAM 332a. The memory interface may further enable communication between at least one of the video processor IC 324 and the receiver IC 326, and FLASH memory 330a, and between at least one of the video processor IC 324 and the receiver IC 326, and RAM 332a. The memory interface 331a may be, for example, a serial RAM (SRAM) interface. The SRAM interface may comprise a serial communication link between the IC 320a and FLASH memory 330a and RAM 332a.

The PMU 334a may comprise suitable logic, circuitry and/or code that may be adapted to manage power consumption for various devices. The control interface 333a may comprise suitable logic and/or circuitry that may be adapted to enable communication between the baseband processor IC 320a and the PMU 334a. An exemplary aspect of the control interface 333a may be the inter-integrated circuit (I²C) bus. The I²C bus may comprise a serial communication link between IC devices. The PMU may use the control bus to instruct the baseband processor IC 320a to temporarily shut down some operational modes to reduce power consumption to extend battery life in a mobile terminal.

The plurality of peripherals 336a, 338a, 340a, 342a, 344a, 346a, 348a, and 350a may provide input to or receive output from at least one of the HEDGE baseband processor IC 320a, the DVB-H receiver IC 326, and the video processor with MPEG-2/4 decoder IC 324. For example, the peripheral 344a may provide communication access to a wireless local area network (WLAN) and the peripheral 350a may provide communication access to Bluetooth devices. The peripheral 348a may be a universal subscriber identity module (USIM), in which the USIM may contain relevant information that enable a user to receiver services from a GSM and/or UMTS network. An interface may couple the baseband processor IC 320a, the DVB-H receiver IC 326, the video processor IC 324, and the plurality of peripherals 336a, 338a, 340a, 342a, 344a, 346a, 348a, and 350a. The interface may comprise suitable logic and/or circuitry that may be adapted to enable communication between the processor IC 320a and at least one of the plurality of peripherals 336a, 338a, 340a, 342a, 344a, 346a, 348a, and 350a. The interface may also be adapted to enable communication between the video processor IC 324 and the receiver IC 326 and at least one of the plurality of peripherals 336a, 338a, 340a, 342a, 344a, 346a, 348a, and 350a. The interface may be, for example, a serial interface.

Each of the HEDGE baseband processor IC 320a, the DVB-H receiver IC 326, and the video processor with MPEG-2/4 decoder IC 324 may communicate with any of the plurality of peripherals 336a, 338a, 340a, 342a, 344a, 346a, 348a, and 350a. Consequently, there is may be interactions between the HEDGE baseband processor IC 320a, and at least one of the DVB-H receiver IC 326, and the video processor with MPEG-2/4 decoder IC 324 in at least one of the peripherals 336a, 338a, 340a, 342a, 344a, 346a, 348a and 350a. For example, the keypad 338a may be utilized by a user to initiate requests for at least one of cellular frequency band communications services and VHF/UHF broadcast services. Similarly, the display 336a may present output to the user from at least one of cellular frequency broadcast services and VHF/UHF broadcast services.

The RAM 332a and the FLASH memory 330a may be accessible by the HEDGE baseband processor IC 320a and by at least one of the video processor IC 324 and the receiver IC 326 via the memory interface 331a. The FLASH 330a may contain machine-readable code may be executed by the HEDGE baseband processor IC 320a within a mobile terminal to perform tasks related to the execution of signaling protocols with a cellular communications network for the establishment of cellular frequency band communication services between the mobile terminal and a cellular communications network. The FLASH 330a may also store persistent data which are to be maintained at a mobile terminal even after the mobile terminal has been powered off and subsequently powered on. The RAM 332a may be used by the HEDGE processor IC 320a to store non-persistent data which may be lost if the mobile terminal is powered off and subsequently powered on.

The HEDGE baseband processor IC 320a may process baseband signals associated with a plurality of cellular frequency band communications services. The DBV-H receiver IC 326 and the video processor with MPEG-2/4 decoder IC 324 may process baseband signals associated with VHF/UHF band broadcast services. The DVB-H receiver IC 326 may also process multiprotocol encapsulated (MPE) data sent in a datacast over a broadcast network. The processed signals from the HEDGE baseband processor IC 320a, and the DVB-H receiver IC 326, and video processor with MPEG-2/4 decoder IC 324 may be presented to a user of a mobile terminal via an input/output device.

Figure 3E:
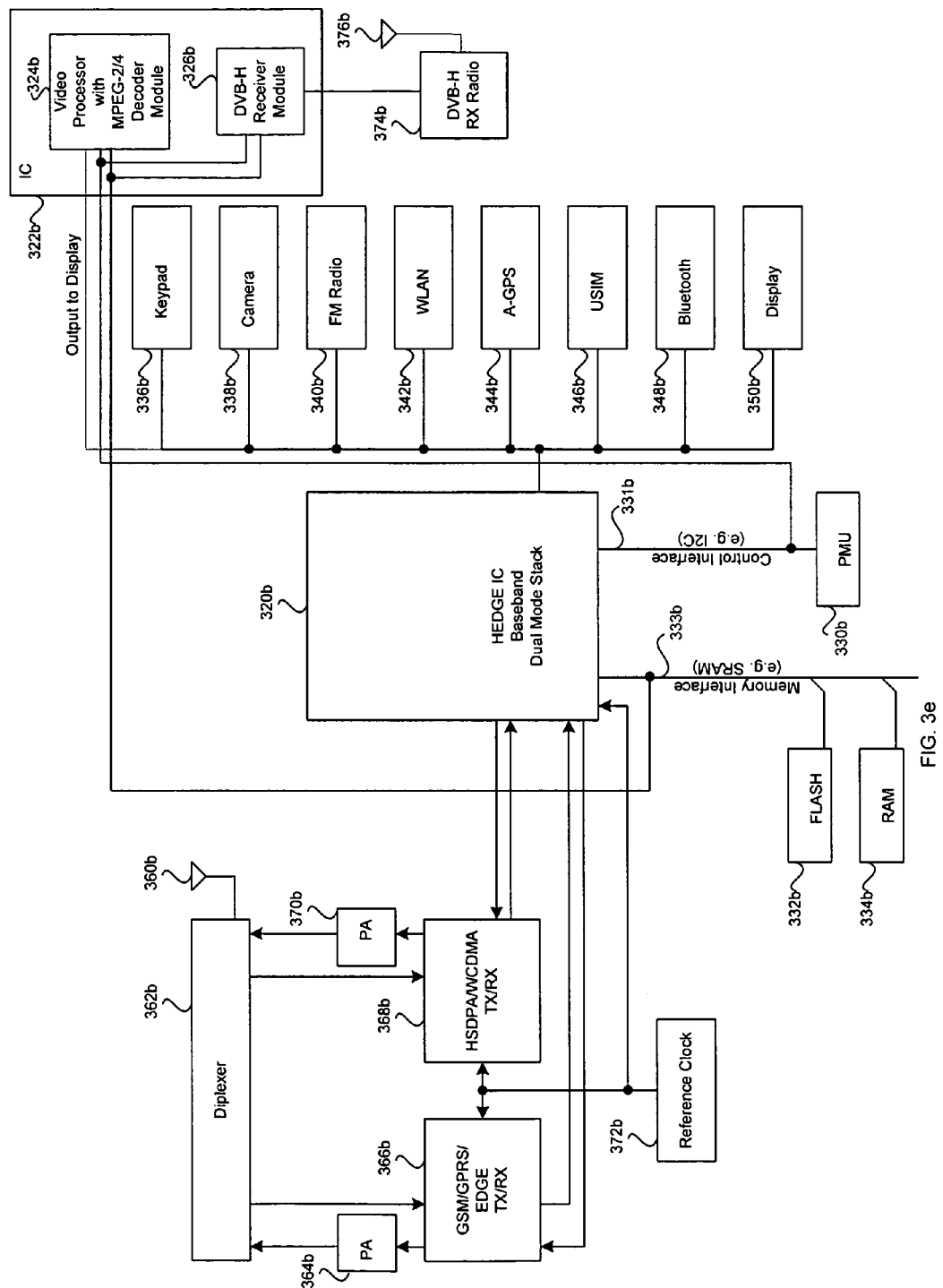
FIG. 3e is a block diagram illustrating an exemplary processing circuit for a mobile terminal, in accordance with an embodiment of the invention.

FIG. 3e is a block diagram illustrating an exemplary processing circuit for a mobile terminal, in accordance with an embodiment of the invention. Referring to FIG. 3e, there is shown the HEDGE processor IC 320b, the video processor with MPEG-2/4 decoder and DVB-H receiver IC 322b, the FLASH memory 330b, the RAM 332b, the PMU 334b, plurality of peripherals 336b, 338b, 340b, 342b, 344b, 346b, 348b, and 350b. There is further shown antennas 360b and 376b, a diplexer 362b, power amplifiers (PAs) 364b and 370b, the GSM/GPRS/EDGE RFFE 366b and the HSDPA/WCDMA RFFE 368b, the DVB-H receiver front end (RFE) 374b, and a reference clock 372b. The video processor with MPEG-2/4 decoder and DVB-H receiver IC 322b, may comprise the video processor with MPEG-2/4 decoder module 324b, and the DVB-H receiver module 326b. The HEDGE baseband processor IC 320b is an exemplary aspect of the single cellular processor IC (307 in FIG. 3a). The DVB-H receiver and MPEG-2/4 decoder IC 322b is an exemplary aspect of the single broadcast processor IC (308 in FIG. 3a).

Figure 3F:
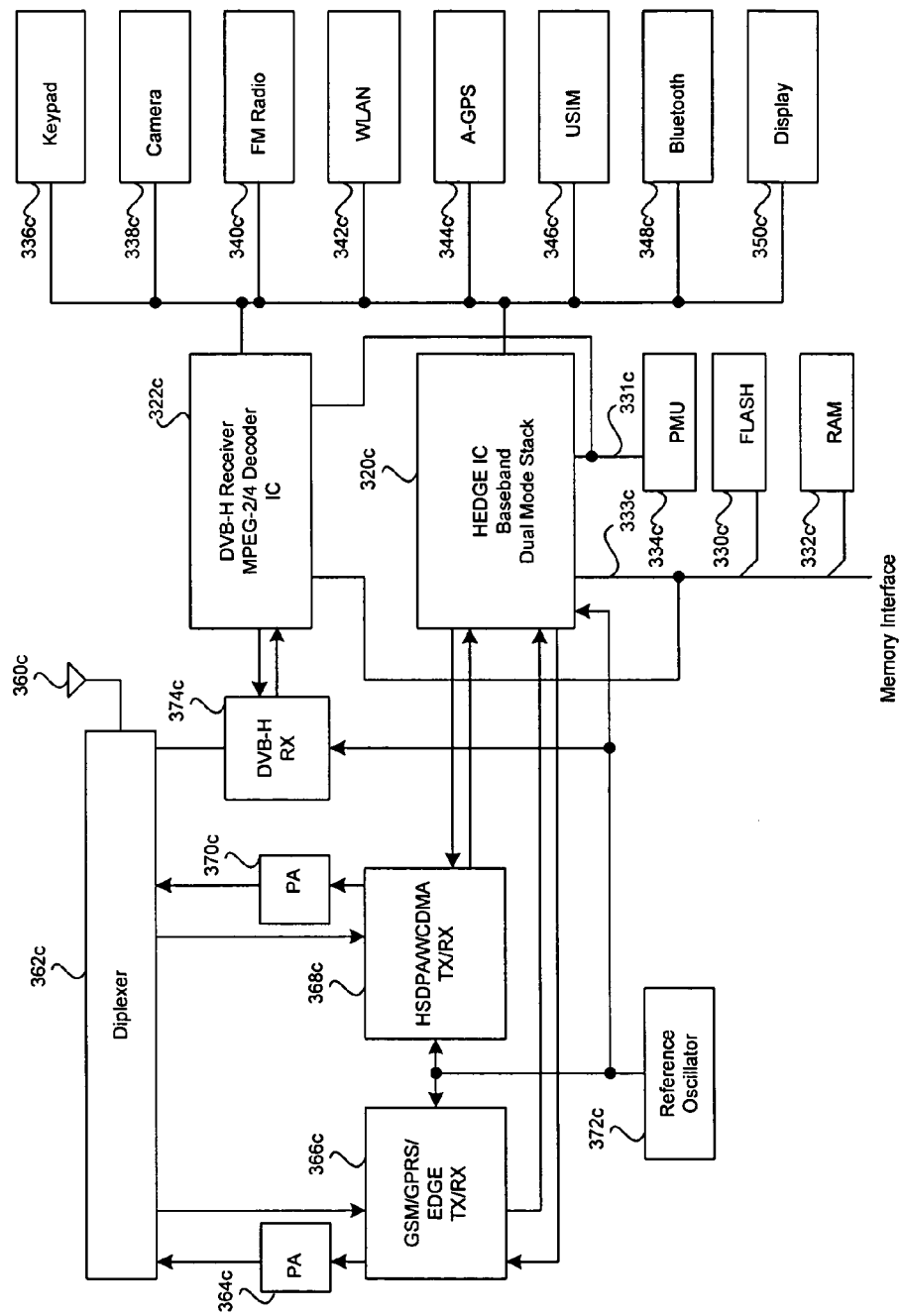
FIG. 3f is a block diagram illustrating an exemplary connection of the HEDGE IC, the video processor with MPEG-2/4 decoder and the DVB-H receiver IC to a plurality of support devices, including RFFEs and a single antenna, in accordance with an embodiment of the invention.

FIG. 3f is a block diagram illustrating an exemplary connection of the HEDGE IC, the video processor with MPEG-2/4 decoder and the DVB-H receiver IC to a plurality of support devices, including RFFEs and a single antenna, in accordance with an embodiment of the invention. Referring to FIG. 3f, there is shown the HEDGE baseband processor IC 320c, the DVB-H receiver and MPEG-2/4 decoder IC 322c, the FLASH memory 330c, the RAM 332c, the PMU 334c, plurality of peripherals 336c, 338c, 340c, 342c, 344c, 346c, 348c, and 350c. There is further shown an antenna 360c, a diplexer 362c, power amplifiers (PAs) 364c and 370c, GSM/GPRS/EDGE RFFE 366c and HSDPA/WCDMA RFFE 368c, DVB-H receiver front end (RFE) 374c, and a reference clock 372c. The HEDGE baseband processor IC 320c is an exemplary aspect of the single cellular processor IC (307 in FIG. 3a). The DVB-H receiver and MPEG-2/4 decoder IC 322c is an exemplary aspect of the single broadcast processor IC (308 in FIG. 3a).

The antenna 360c may comprise suitable logic and/or circuitry that may be adapted to receive and transmit RF signals. The diplexer 362c may comprise suitable logic and/or circuitry that may be adapted to isolate received signals from transmitted signals. This may prevent received signals from being corrupted by the much stronger transmitted signals. The diplexer 362c may also allow transmission of signals from multiple RFFEs, for example, RFFEs 366c and 368c, and RFE 374c to the same transmission antenna, for example, antenna 360c. The reference clock 372c may comprise suitable logic and/or circuitry that may be adapted to provide a clocking signal to the RFFEs 366c and 368c, the RFE 374c and to the HEDGE baseband processor IC 320c.

In accordance with an embodiment of the invention, and with reference to FIG. 1a, the wireless service provider network 104, and the terrestrial broadcast network 102, and/or the service provider network 106, may communicate when delivering any content among the plurality of cellular frequency band communications services or VHF/UHF band broadcast services. In addition, the wireless service provider network 104 may be adapted to provide high data rate broadcast and multicast services utilizing MBMS. In one aspect of cooperation between the networks, a mobile terminal, such as 116a, may attempt to receive a program which is broadcast on a VHF/UHF channel by a terrestrial broadcast network 102. However, the mobile terminal 116a may be out of the broadcast area to receive the program via the desired VHF/UHF channel. The single broadcast processor IC, such as 322 in FIG. 3c, may exchange information with the single cellular processor IC, such as 320 in FIG. 3c, via a single memory to establish, for example, a service using MBMS to deliver the program via the wireless service provider network 104. The program may originate in the terrestrial broadcast network 102, be transported by the service provider 106 to the cellular network 104, and subsequently be delivered to the mobile terminal 116a via the wireless service provider network 104. No manual intervention from the user may be required.

Figure 3G:
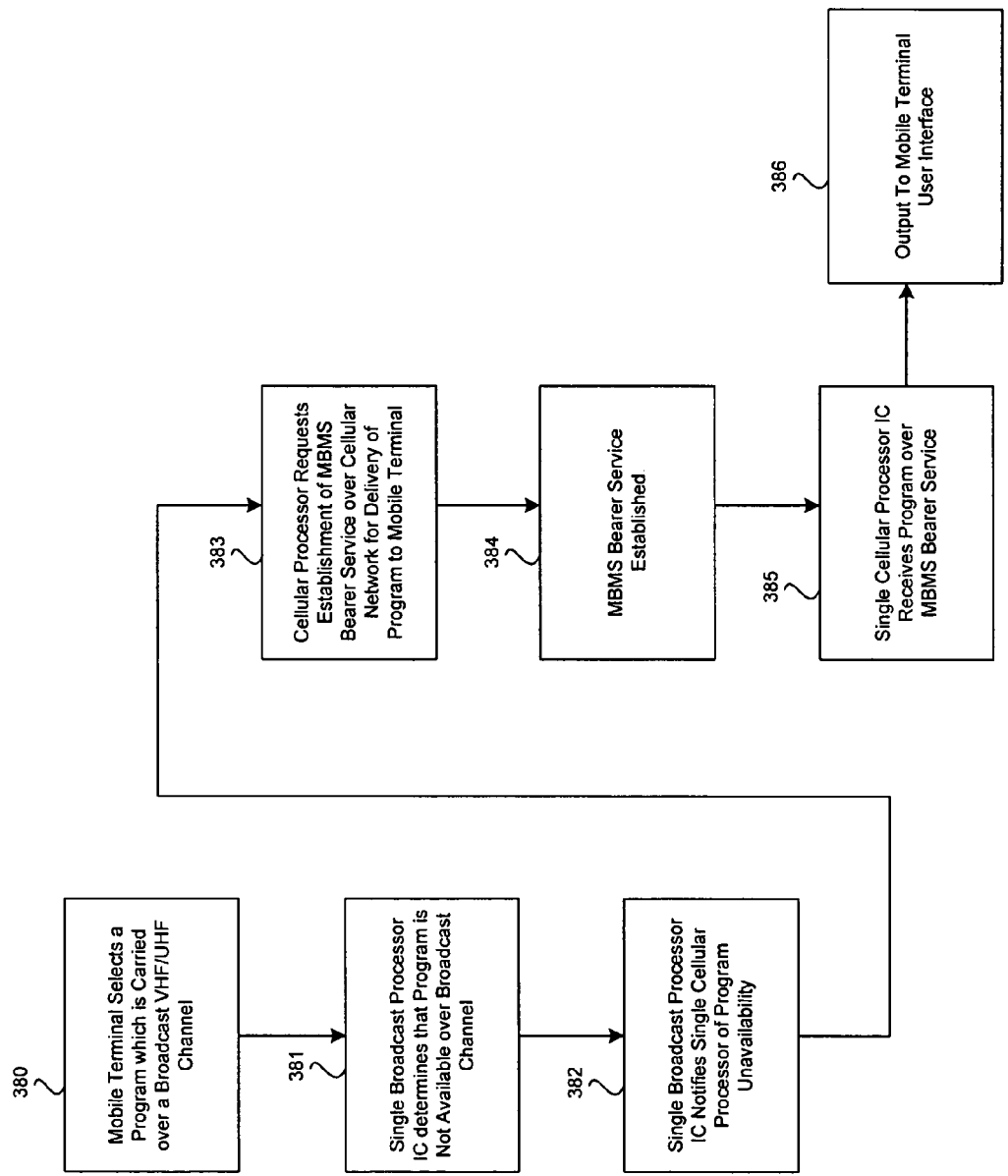
FIG. 3g is an exemplary flow diagram illustrating reception of cellular frequency band communications services and VHF/UHF band broadcast services at a mobile terminal, with no integration of services between the networks, in accordance with an embodiment of the invention.

FIG. 3g is an exemplary flow diagram illustrating reception of VHF/UHF band broadcast services over a cellular network at a mobile terminal, with high integration of services between the networks, in accordance with an embodiment of the invention. Referring to FIG. 3g, in step 380 the mobile terminal selects a program, which is communicated via a broadcast VHF/UHF channel. In step 381, the single broadcast processor IC determines that the program is not available via the VHF/UHF broadcast channel. In step 382, the single broadcast processor IC notifies the single cellular processor IC of the program unavailability. In step 383, the single cellular processor IC requests establishment of, for example, MBMS service via the wireless service provider network for delivery of the program to the mobile terminal. In step 384, MBMS service, for example, is established to the mobile terminal. In step 385, the single cellular processor IC receives the program via the MBMS service. In step 386, output is sent to the mobile terminal user interface.

In another aspect of cooperation between the networks, and with reference to FIG. 1a, a mobile terminal 116a may request service via a wireless service provider network 104 with specified quality of service (QoS) criteria. The service provider network 106 may take the QoS request into consideration in determining how to establish the service to the mobile terminal 116a. The single baseband cellular processor IC, 320 in FIG. 3c, in the mobile terminal 116a may establish a communication to a service provider 106 via the wireless service provider network 104. The single baseband cellular processor IC, 320 in FIG. 3c, may request content from the service provider 106 via the wireless service provider network 104. The service provider 106 may determine the QoS required to deliver the program to the mobile terminal 116a. If the service provider 106 determines that the QoS requirements to deliver the content to the mobile terminal 116a cannot be met via the wireless service provider network 104, the content may be delivered via the terrestrial broadcast network 102.

Upon determining that the program content is to be delivered via the terrestrial broadcast network 102, the service provider 106 may send a request to the terrestrial broadcast network 102 to communicate the content requested by the mobile terminal 116a. The terrestrial broadcast network 102 may reply to the service provider 106 indicating the VHF/UHF channel assignment, which may be utilized to broadcast the content. The service provider 106 may communicate to the mobile terminal 116a via the wireless service provider network 104 indicating that the desired content will be delivered via the terrestrial broadcast network 102 via the assigned VHF/UHF channel. The single baseband cellular processor IC, 320 in FIG. 3c, may communicate with the single baseband broadcast processor IC, 322 in FIG. 3c, in the mobile terminal 116a, to transfer information about the content being broadcast via the terrestrial broadcast network 102. The service provider 106 may initiate transfer of content to the terrestrial broadcast network 102. The single baseband broadcast processor IC, 322 in FIG. 3c, in the mobile terminal 116a, may select the assigned VHF/UHF broadcast channel and begin reception of the content requested by the mobile terminal 116a. The single baseband cellular processor IC, 320 in FIG. 3c, may terminate communication with the service provider 106 via the wireless service provider network 104.

Figure 3H:
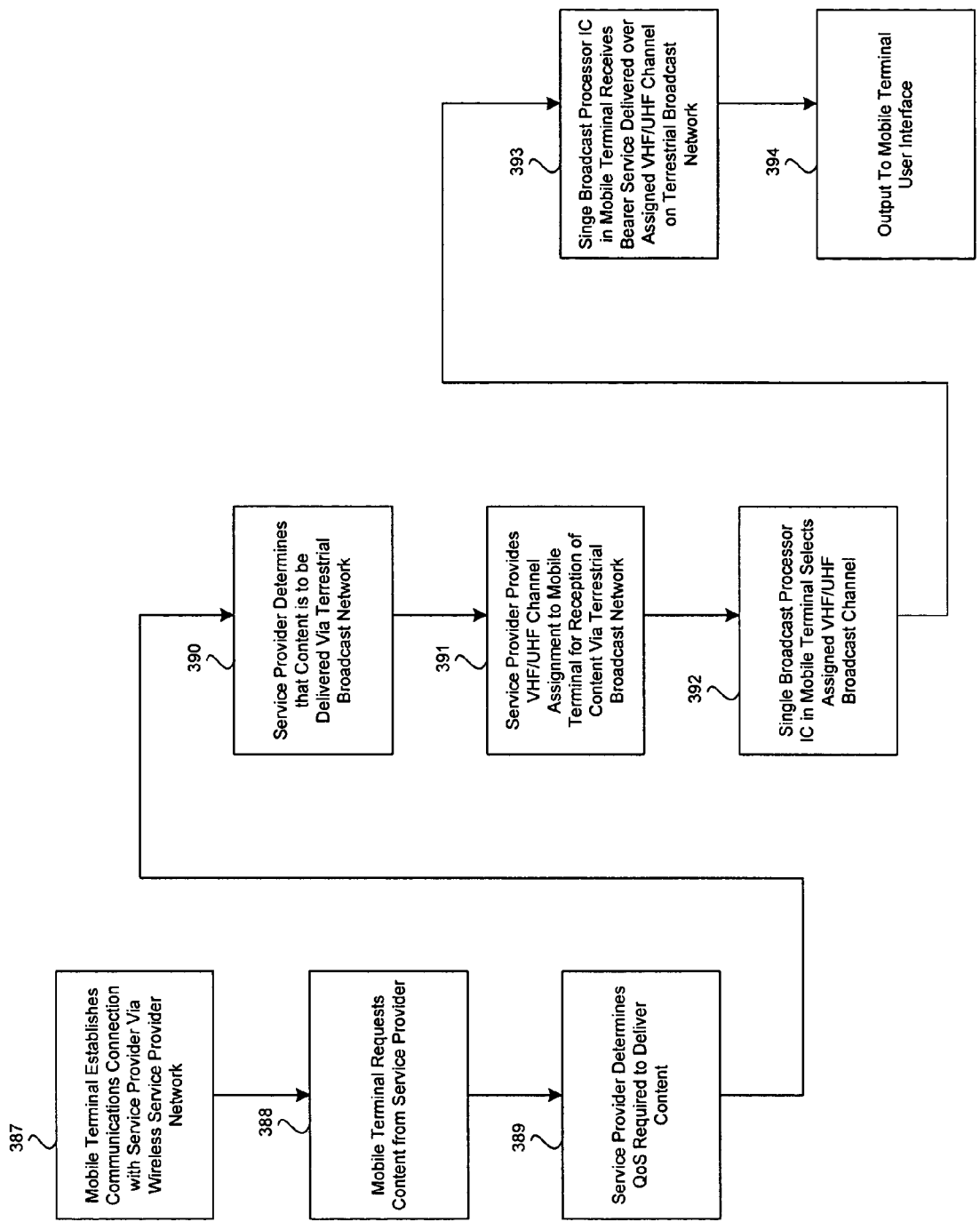
FIG. 3h is an exemplary flow diagram illustrating reception of VHF/UHF band broadcast services over a cellular network at a mobile terminal, with medium integration of services between the networks, in accordance with an embodiment of the invention.

FIG. 3h is an exemplary flow diagram illustrating reception of cellular frequency band communications services over a broadcast network at a mobile terminal, with intelligent service integration between the networks, in accordance with an embodiment of the invention. Referring to FIG. 3h, in step 387 the mobile terminal establishes a communications connection with a service provider via the wireless service provider network. In step 388, the mobile terminal requests content from the service provider. In step 389, the service provider determines the QoS that may be required to deliver the content. In step 390, the service provider determines that the content is to be delivered via the terrestrial broadcast network. In step 391, the service provider provides the VHF/UHF channel assignment to the mobile terminal for reception of the requested content via the terrestrial broadcast network. In step 392, the single broadcast processor IC in the mobile terminal selects the assigned VHF/UHF broadcast channel. In step 393, the single broadcast processor IC in the mobile terminal receives service delivered over assigned VHF/UHF channel on broadcast network. In step 394, output is sent to the mobile terminal user interface.

In accordance with an embodiment of the invention, with reference to FIG. 1a, the single broadcast processor IC, 322 in FIG. 3c, at a mobile terminal 116a may collect a plurality of statistics related to VHF/UHF broadcast services received at the mobile terminal 116a. The single broadcast processor IC, 322 in FIG. 3c, may subsequently communicate with the single cellular processor IC, 320 in FIG. 3c, in the mobile terminal 116a, to report the statistics to the service provider 106. The single cellular processor IC, 320 in FIG. 3c, in the mobile terminal 116, may establish a communication channel with the service provider 106 via the wireless service provider network 104 to report the statistics. The service provider 106 may collect the statistics and subsequently use them to determine whether to utilize the wireless service provider network 104, or the terrestrial broadcast network 102 in fulfilling requests from mobile terminals such as 116a.

Figure 3I:
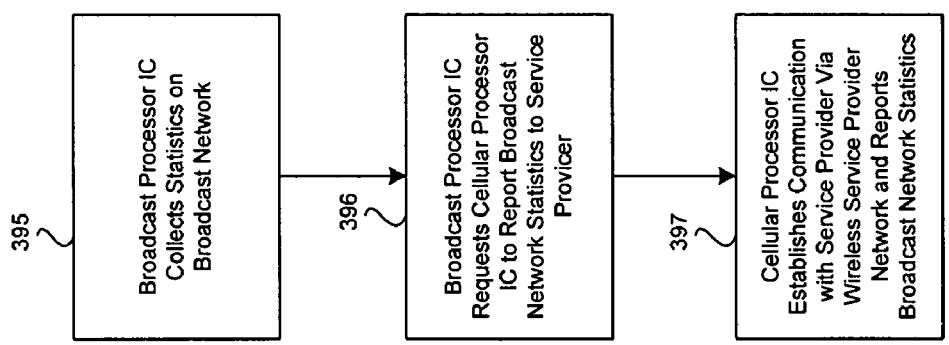
FIG. 3i is an exemplary flow diagram illustrating reception of cellular frequency band communications services over a broadcast network at a mobile terminal, with medium integration of services between the networks, in accordance with an embodiment of the invention.

FIG. 3i is an exemplary flow diagram illustrating the collection of broadcast network statistics in a mobile terminal with the reporting of those statistics being sent via the cellular network. Referring to FIG. 3i, in step 395 the single broadcast processor IC collects statistics on the broadcast network. In step 396, the single broadcast processor IC notifies the single cellular processor IC and requests that the statistics be reported to the service provider. In step 397, the single cellular processor IC establishes communication with the service provider via the wireless service provider network to report the broadcast network statistics.

Figure 4:
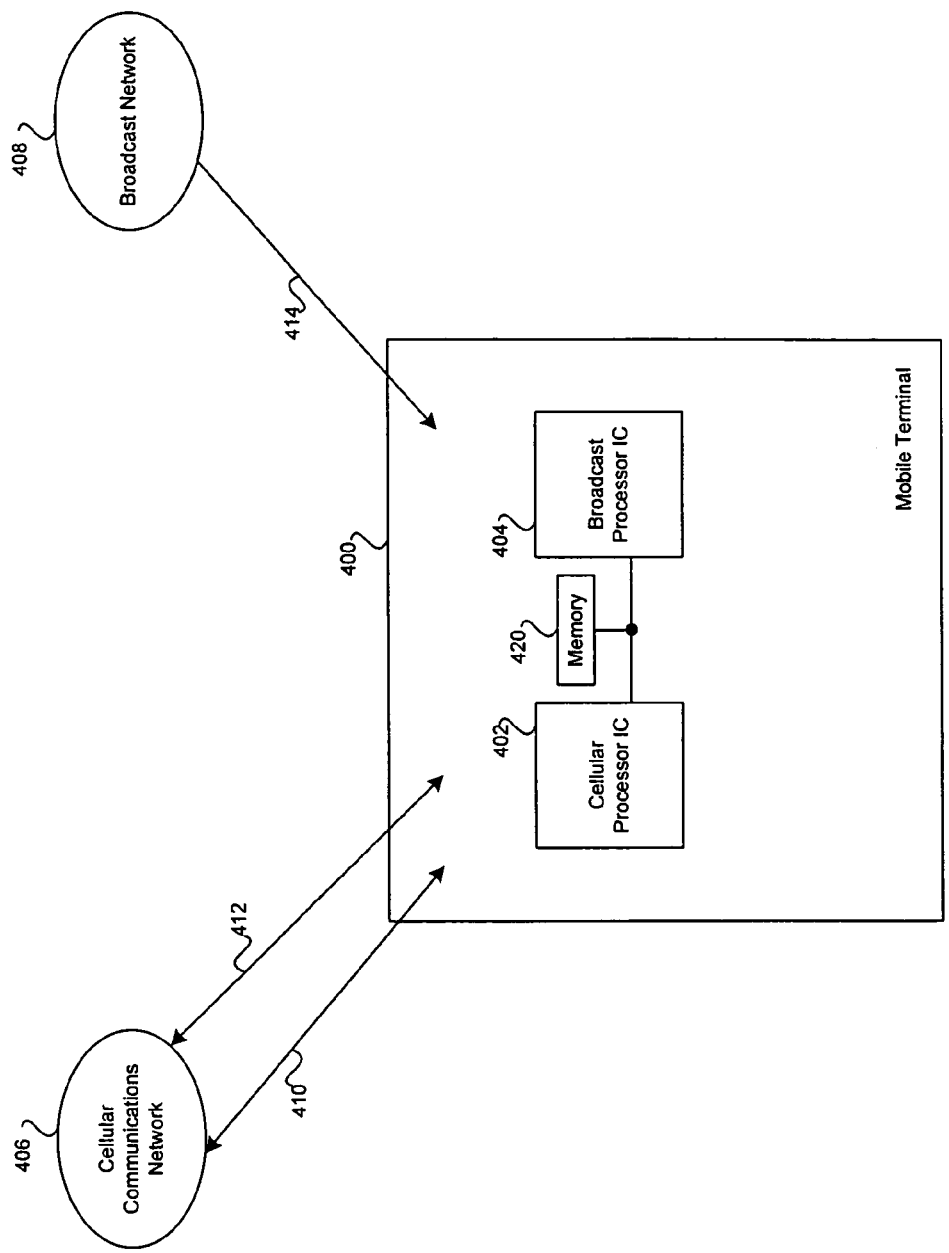
FIG. 4 is an exemplary block diagram illustrating a mobile terminal in accordance with an embodiment of the invention.

FIG. 4 is an exemplary block diagram illustrating a mobile terminal in accordance with an embodiment of the invention. Referring to FIG. 4, there is shown a mobile terminal 400, a single cellular processor IC 402, a single broadcast processor IC 404, a cellular communications network 406, a broadcast network 408, a cellular frequency band voice communication service 410, a cellular frequency band data communication service 412, a VHF/UHF band broadcast service 414, and a single memory 420. The mobile terminal 400 may be utilized to communicate with a plurality of communications networks. Exemplary aspects of communications networks as shown in FIG. 4 may comprise a plurality of cellular communications networks, such as 406, and broadcast networks, such as 408. The mobile terminal 400 may comprise cellular processing circuitry that processes a plurality of cellular frequency band communications services comprising at least one voice service, such as 410, and at least one data service, such as 412, in a single cellular processor integrated circuit, such as 402. The mobile terminal 400 may also comprise broadcast processing circuitry that processes VHF/UHF band broadcast services, such as 414, in a single broadcast processor integrated circuit, such as 404. The processor IC 402 may communicate with, and share a single memory 420 with, processor IC 404.

Accordingly, the present invention may be realized in hardware, software, or a combination of hardware and software. The present invention may be realized in a centralized fashion in at least one computer system, or in a distributed fashion where different elements are spread across several interconnected computer systems. Any kind of computer system or other apparatus adapted for carrying out the methods described herein is suited. A typical combination of hardware and software may be a general-purpose computer system with a computer program that, when being loaded and executed, controls the computer system such that it carries out the methods described herein.

The present invention may also be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

While the present invention has been described with reference to certain embodiments, it will be understood by those skilled in the art that various changes may be made and equivalents may be substituted without departing from the scope of the present invention. In addition, many modifications may be made to adapt a particular situation or material to the teachings of the present invention without departing from its scope. Therefore, it is intended that the present invention not be limited to the particular embodiment disclosed, but that the present invention will include all embodiments falling within the scope of the appended claims.

What is claimed is:

1. A system for communicating with a plurality of communications networks, the system comprising:
one or more circuits for use within a mobile terminal, said one or more circuits comprising a cellular processor and a broadcast processor:
said one or more circuits being operable to generate a request message comprising a specified quality of service, said request message requests delivery of information from a service provider via a wireless communication network utilizing a multiple broadcast/multicast service (MBMS);
said one or more circuits are operable to receive a reply message from said service provider indicating said delivery of said requested information via a terrestrial broadcast network based on said specified quality of service;
said one or more circuits are operable to communicate said received reply message from said cellular processor to said broadcast processor;
said one or more circuits are operable to select a broadcast channel comprising one or more frequencies within a broadcast frequency band to receive at least a portion of said information at said broadcast processor, in response to said received reply message; and said one or more circuits are operable to transmit subsequent information via said cellular processor concurrently with said receiving of said at least a portion of said information at said broadcast processor.

2. The system according to claim 1, wherein said one or more circuits are operable to receive a subsequent portion of said information via said cellular processor.

3. The system according to claim 1, wherein said one or more circuits are operable to receive a subsequent portion of said information via one or more downlink frequencies within a cellular frequency band utilizing said MBMS.

4. The system according to claim 1, wherein said one or more circuits are operable to transmit collected broadcast network statistics based on said received information to said service provider via said cellular processor.

5. The system according to claim 1, wherein said broadcast frequency band comprises a VHF band and/or UHF band.

6. The system according to claim 1, wherein said selected broadcast channel is a digital television (DTV) channel.

7. The system according to claim 1, wherein said cellular processor processes signals within a personal communication service (PCS) frequency band.

8. The system according to claim 1, wherein said one or more circuits are operable to receive subsequent information via said cellular processor concurrently with said receiving of said at least a portion of said information at said broadcast processor.

9. The system according to claim 1, wherein said one or more circuits are operable to generate said subsequent information based on said received at least a portion of said information.

10. A method for communicating with a plurality of communications networks, the method comprising:

in a mobile terminal comprising a cellular processor and a broadcast processor:
generating a request message comprising a specified quality of service, said request message requests delivery of information from a service provider via a wireless communication network utilizing a multiple broadcast/multicast service (MBMS);
receiving a reply message from said service provider indicating said delivery of said requested information via a terrestrial broadcast network based on said specified quality of service;
communicating said received reply message from said cellular processor to said broadcast processor;
selecting a broadcast channel comprising one or more frequencies within a broadcast frequency band to receive at least a portion of said information at said broadcast processor, in response to said received reply message; and
transmitting subsequent information via said cellular processor concurrently with said receiving of said at least a portion of said information at said broadcast processor.

11. The method according to claim 10, comprising receiving a subsequent portion of said information via said cellular processor.

12. The method according to claim 10, receiving a subsequent portion of said information via one or more downlink frequencies within a cellular frequency band utilizing said MBMS.

13. The method according to claim 10, comprising transmitting collected broadcast network statistics based on said received information to said service provider via said cellular processor.

14. The method according to claim 10, wherein said broadcast frequency band comprises a VHF band and/or UHF band.

15. The method according to claim 10, wherein said selected broadcast channel is a digital television (DTV) channel.

16. The method according to claim 10, wherein said cellular processor processes signals within a personal communication service (PCS) frequency band.

17. The method according to claim 10, comprising receiving subsequent information via said cellular processor concurrently with said receiving of said at least a portion of said information at said broadcast processor.

18. The method according to claim 10, comprising generating said subsequent information based on said received at least a portion of said information.

\* \* \* \* \*